(12) United States Patent
Apte et al.

(10) Patent No.: US 8,010,085 B2
(45) Date of Patent: Aug. 30, 2011

(54) TRAFFIC REDIRECTION IN CLOUD BASED SECURITY SERVICES

(75) Inventors: Manoj Apte, San Jose, CA (US);
Sivprasad Udupa, San Jose, CA (US);
Alex Motyashov, Santa Clara, CA (US);
Srikanth Devarajan, San Jose, CA (US)

(73) Assignee: Zscaler, Inc., Sunnyvale, CA (US)

( * ) Notice: Subject to any disclaimer, the term of this patent is extended or adjusted under 35 U.S.C. 154(b) by 409 days.

(21) Appl. No.: 12/274,222

(22) Filed: Nov. 19, 2008

(65) Prior Publication Data

US 2010/0125903 A1   May 20, 2010

(51) Int. Cl.
*H04M 1/66* (2006.01)

(52) U.S. Cl. .......... 455/410; 709/223; 709/227; 726/15; 370/338

(58) Field of Classification Search .................. 455/410
See application file for complete search history.

(56) References Cited

U.S. PATENT DOCUMENTS

| | | | |
|---|---|---|---|
| 6,839,338 B1* | 1/2005 | Amara et al. | 370/338 |
| 6,954,790 B2* | 10/2005 | Forslow | 709/227 |
| 6,999,409 B2 | 2/2006 | Oyamada | |
| 7,610,038 B2* | 10/2009 | Tan et al. | 455/410 |
| 2004/0083295 A1 | 4/2004 | Amara et al. | |
| 2004/0181664 A1 | 9/2004 | Hoefelmeyer et al. | |
| 2005/0182967 A1 | 8/2005 | Phillips et al. | |
| 2006/0005231 A1 | 1/2006 | Zuk et al. | |
| 2007/0268858 A1 | 11/2007 | Soto | |
| 2008/0244741 A1 | 10/2008 | Gustafson et al. | |
| 2010/0100616 A1* | 4/2010 | Bryson et al. | 709/223 |

FOREIGN PATENT DOCUMENTS

| | | |
|---|---|---|
| WO | WO2007/027658 A2 | 3/2007 |
| WO | WO 2007/027658 A2 | 3/2007 |

OTHER PUBLICATIONS

Notification of Transmittal of the International Search Report and the Written Opinion of the International Searching Authority, or the Declaration, PCT/US2009/064917 dated Jun. 28, 2010, 12 pages.

* cited by examiner

*Primary Examiner* — Charles Shedrick
(74) *Attorney, Agent, or Firm* — Clements Bernard PLLC; Lawrence A. Baratta, Jr.; Christopher L. Bernard

(57) ABSTRACT

Systems, methods and apparatus for tunneling in a cloud based security system. Management of tunnels, such as data tunnels, between enterprises and processing nodes for a security service is facilitate by the use of virtual gateway nodes and migration failover to minimize traffic impacts when a tunnel is migrated from one processing node to another processing node.

19 Claims, 15 Drawing Sheets

TRAFFIC REDIRECTION IN CLOUD BASED SECURITY SERVICES

BACKGROUND

This disclosure relates to security provisioning.

The prevalence and accessibility of computer networks requires security measures to protect valuable information. An enterprise, for example, can implement such security measures by use of a layered security system. Such a layered security system can be implemented at the network edge of the enterprise, e.g., firewalls, gateway security agents, etc. Additionally, a layered security system can also include security processes and agents that are implemented throughout the enterprises, e.g., virus scanning software on each computer device within the enterprise, content filtering software, content monitoring software, etc.

However, such layered security systems are prone to processing inefficiencies and can require many resources within the enterprise to maintain the systems. The use of an "in-the-cloud" distributed security system that provides security services external to a network edge of an enterprise can overcome many of these processing inefficiencies. Examples of such distributes security systems and methods are disclosed in U.S. application Ser. No. 12/128,371, filed May 28, 2008 and entitled "Distributed Security Provisioning," and U.S. application Ser. No. 12/179,441, filed Jul. 24, 2008 and entitled "HTTP Authentication and Authorization Management," the disclosures of which are incorporated herein by reference.

In the distributed security systems described in the above-reference applications, an enterprise can transmit data to and receive data from the distributed security system by use of tunneling technologies. Example tunneling technologies include generic routing encapsulation (GRE), layer two tunneling protocol (L2TP), point-to-point tunneling protocol (PPTP) or IPSec protocols may be used. Virtual private network (VPN) routers and VPN concentrators can be used to achieve the traffic redirection for tunneling.

The use of tunneling, however, presents the enterprise with specific challenges and problems. One problem is that when a node for a tunnel fails, newly established tunnel end points after a tunnel is reestablished differ in their internet protocol (IP) addresses. Hence tunnel packets that are in the transit and addressed to the previous IP address are lost in the internet cloud, causing retransmission and disconnects of the client connections.

Another problem is that asymmetric routing paths can cause one tunnel end to infer the tunnel to be "dead" while the other tunnel end to infer the tunnel to be alive. When either end has discovered a path fault, a common good path must be provided to reach the tunnel ends. Existing tunneling protocols do not address this problem.

Yet another problem is that tunneling is agnostic to the type of traffic being carried in the tunnel. In security service provisioning, two types of traffic are originated. User's data traffic and user's authentication traffic. By using tunneling, both the data and authentication traffic are directed to the processing node, which in turn has to delegate the traffic to the authentication nodes.

Another challenge is the acceptance of user sessions at a different security service nodes during failover without traffic interruption or repeated user logins. Unless the authenticated state of the users of the tunnel is communicated to the distributed service nodes, a tunnel failure may create repeated user authentications.

Another challenge occurs when connections from a security service node may use a public IP address owned by the security service and not owned by the enterprise. Thus, location based services may be disrupted by the use of the service owned addresses.

Yet another challenge is present by the inability to perform seamless migration on a tunnel failure. Tunnel failures are detected by the health monitoring techniques of the underlying tunneling technology.

SUMMARY

In general, one aspect of the subject matter described in this specification can be embodied in a method for providing security services to a plurality of enterprises over a plurality of processing nodes external to the network edges of the enterprises. The method includes, in each processing node: hosting a plurality of virtual gateway nodes, each virtual gateway node corresponding to an enterprise and having an associated tunnel destination address for a corresponding tunnel, each tunnel destination address being an internet protocol address of the corresponding enterprise; propagating routing data related to the processing node and the virtual gateway nodes, and receiving routing data propagated by other processing nodes and a monitoring node in data communication with the processing nodes; managing classified content items in accordance with security policy data so that security policies for the plurality of enterprises in data communication with the processing nodes over tunnels corresponding to the virtual gateway nodes are implemented external to the network edges for each of the enterprises; and, in the monitoring node: monitoring a tunnel status of each of the corresponding tunnels in the processing nodes; detecting routes to each of the virtual gateway nodes and propagating routing data related to the processing nodes and the virtual gateway nodes to the processing nodes; and identifying failover states for the tunnels, and in response to identifying a failover state for a first tunnel in a first processing node: updating the routing data to specify a second processing node as hosting a virtual gateway node associated with the first tunnel and hosted in the first processing node; and propagating the updated routing data to the processing nodes so that the second processing node hosts the virtual gateway node. Other implementations of this aspect include corresponding systems, apparatus, and computer program products.

Another aspect of the subject matter described in this specification can be embodied in a method that includes, in each processing node: hosting a plurality of internet protocol addresses, each internet protocol address corresponding to an enterprise and being a tunnel destination address for a corresponding tunnel established between the enterprise and the processing node; propagating routing data related to the processing node and the internet protocol addresses, and receiving routing data propagated by other processing nodes and a monitoring node in data communication with the processing node, the routing data defining routing for the internet protocol addresses hosted by the processing nodes; and storing security policy data defining security policies for each of the enterprises, performing a threat detection process to classify content items according to a threat classification for a corresponding threat, and managing the classified content item in accordance with the security policy data so that security policies for the plurality of enterprises in data communication with the processing nodes over the corresponding tunnels established between the enterprise and the processing node are implemented external to the network edges for each of the enterprises; and, in a monitoring node: monitoring a tunnel status of each of the corresponding tunnels in the processing nodes; detecting routes to each of the internet protocol addresses and propagating corresponding routing data related to the processing nodes and the internet protocol addresses hosted by the processing nodes to the processing nodes; and identifying failover states for the tunnels, and in response to identifying a failover state for a first tunnel in a first processing node: updating the routing data to specify a second processing node as hosting an internet protocol address that is the tunnel destination address of the first tunnel and hosted in the first processing node; and propagating the updated routing data to the processing nodes so that the second processing node hosts the internet protocol address. Other implementations of this aspect include corresponding systems, apparatus, and computer program products.

One or more of the following advantages can be realized by implementations of the subject matter described in this specification. Separate user sessions can be maintained and security policies applied on a per-user basis. A separate authentication tunnel can be maintained separate from a data tunnel, allowing the acceptance of user sessions at a different security service nodes during failover without traffic interruption or repeated user logins. As the enterprise IP address is hosted by a processing node, location based services interpret the traffic as originating from the enterprise and detects the correct location with respect to addressing. State monitoring of the tunnel and providing the tunnel state when re-hosting a virtual gateway node on another processing node facilitates the migration of a tunnel on a tunnel failure with minimal interruptions.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
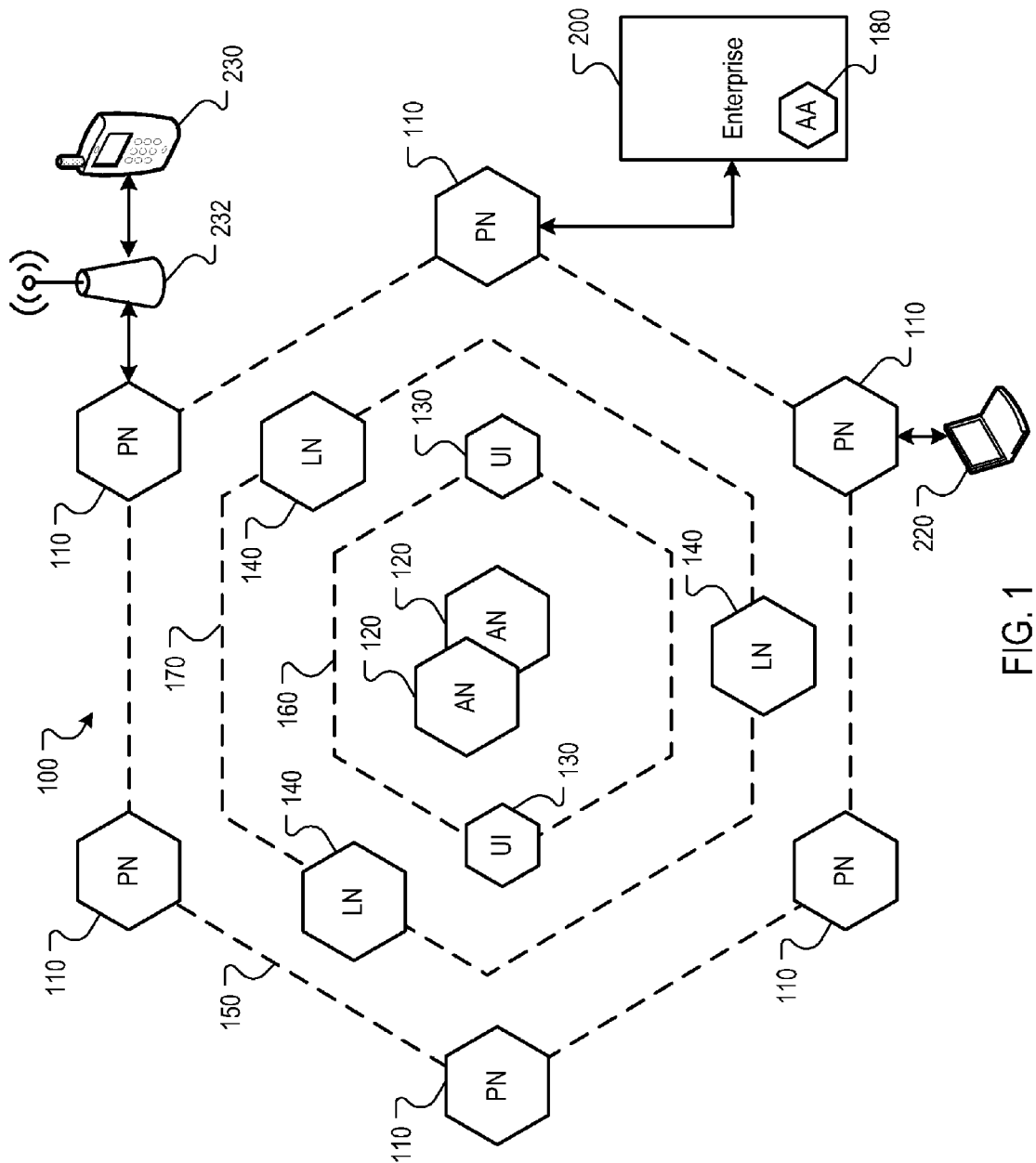
FIG. 1 is a block diagram of a distributed security system.

FIG. 1 is a block diagram of a distributed security system 100. The system 100 can, for example, be implemented as an overlay network in a wide area network (WAN), such as the Internet. The system 100 includes content processing nodes 110 that detect and preclude the distribution of security threats, e.g., malware, spyware, and other undesirable content sent from or requested by an external system. Example external systems can include an enterprise 200, a computer device 220, and a mobile device 230, or other network and computing systems.

§1.0 Example High Level System Architecture

In an example implementation, each processing node 110 can include a decision system, e.g., data inspection engines that operate on a content item, e.g., a web page, a file, an e-mail message, or some other data or data communication that is sent from or requested by one of the external systems. In some implementations, all data destined for or received from the Internet is processed through a processing node 110. In other implementations, specific data specified by each external system, e.g., only e-mail, only executable files, etc., is processed through a processing node 110.

Each processing node 110 can generate a decision vector $D=[d_1, d_2, \ldots, d_n]$ for a content item of one or more parts $C=[c_1, c_2, \ldots, c_m]$. Each decision vector can identify a threat classification, e.g., clean, spyware, malware, undesirable content, innocuous, unknown, etc. For example, the output of each element of the decision vector D can be based on the output of one or more data inspection engines. In some implementations, the threat classification can be reduced to a subset of categories e.g., violating, non-violating, neutral, unknown. Based on the subset classification, a processing node 110 may allow distribution of the content item, preclude distribution of the content item, allow distribution of the content item after a cleaning process, or perform threat detection on the content item.

In some implementations, the actions taken by a processing node 110 can be determinative on the threat classification of the content item and on a security policy of the external system to which the content item is being sent from or from which the content item is being requested by. A content item is violating if, for any part $C=[c_1, c_2, \ldots, c_m]$ of the content item, at any processing node 110, any one of the data inspection engines generates an output that results in a classification of "violating."

Each processing node 110 can be implemented by a plurality of computer and communication devices, e.g., server computers, gateways, switches, etc. In some implementations, the processing nodes 110 can serve as an access layer 150. The access layer 150 can, for example, provide external system access to the security system 100. In some implementations, each processing node 110 can include Internet gateways and a plurality of server computers, and the processing nodes 110 can be distributed through a geographic region, e.g., throughout a country. According to a service agreement between a provider of the system 100 and an owner of an external system, the system 100 can thus provide security protection to the external system at any location throughout the geographic region.

Data communications can be monitored by the system 100 in a variety of ways, depending on the size and data requirements of the external system. For example, an enterprise 200 may have multiple routers that are used to communicate over the Internet, and the routers may be configured to establish communications through the nearest (in traffic communication time) processing node 110. A mobile device 230 may be configured to communication to a nearest processing node 110 through any available wireless access device, such as an access point, or a cellular gateway. A single computer device 220, such as a consumer's personal computer, may have its browser and e-mail program configured to access the nearest processing node 110, which, in turn, serves as a proxy for the computer device 220. Alternatively, an Internet provider may have all of its customer traffic processed through processing nodes 110.

In some implementations, the processing nodes 110 can communicate with one or more authority nodes 120. The authority nodes 120 can store policy data for each external system and can distribute the policy data to each processing node 110. The policy data can, for example, define security policies for a protected system, e.g., security policies for the enterprise 200. Example policy data can define access privileges for users, web sites and/or content that is disallowed, restricted domains, etc. The authority nodes 120 can distribute the policy data to the processing nodes 110.

In some implementations, the authority nodes 120 can also distribute threat data that includes the classifications of content items according to threat classifications, e.g., a list of known viruses, a list of known malware sites, spam e-mail domains, etc. The distribution of threat data between the processing nodes 110 and the authority nodes 120 can implemented by push and pull distribution schemes.

In some implementations, each authority node 120 can be implemented by a plurality of computer and communication devices, e.g., server computers, gateways, switches, etc. In some implementations, the authority nodes 110 can serve as an application layer 160. The application layer 160 can, for example, manage and provide policy data, threat data, and data inspection engines 117 and dictionaries for the processing nodes.

Other application layer functions can also be provided in the application layer, such as a user interface front-end 130. The user interface front-end 130 provides a user interface through which users of the external systems can provide and define security policies, e.g., whether e-mail traffic is to be monitored, whether certain web sites are to be precluded, etc.

Another application capability that can be provided through the user interface front-end 130 is security analysis and log reporting. The underlying data on which the security analysis and log reporting functions operate are stored in logging nodes 140, which serve as a data logging layer 170. Each logging node 140 can store data related to security operations and network traffic processed by the processing nodes 110 for each external system.

In some implementations, the logging node 140 data can be anonymized so that data identifying an enterprise is removed or obfuscated. For example, identifying data can be removed to provide an overall system summary of security processing for all enterprises and users without revealing the identity of any one account. In another example, identifying data can be obfuscated, e.g., provide a random account number each time it is accessed, so that an overall system summary of security processing for all enterprises and users can be broken out by accounts without revealing the identity of any one account. In other implementations, the identifying data and/or logging node 140 data can be further encrypted, e.g., so that only the enterprise (or user if a single user account) can have access to the logging node 140 data for its account. Other processes of anonymizing, obfuscating, or securing logging node 140 data can also be used.

In some implementations, an access agent 180 can be included in the external systems. For example, an access agent 180 is deployed in the enterprise 200. The access agent 180 can, for example, facilitate security processing by providing a hash index of files on a client device to a processing node 110, or can facilitate authentication functions with a processing node 110, e.g., by assigning tokens for passwords and sending only the tokens to a processing node so that transmission of passwords beyond the network edge of the enterprise is minimized. Other functions and processes can also be facilitated by an access agent 180.

In some implementations, the processing node 110 may act as a forward proxy that receives user requests to external servers addressed directly to the processing node 110. In other implementations, the processing node 110 may access user requests that are passed through processing node 110 in the transparent mode. A protected system, e.g., enterprise 200, can, for example, choose one or both of these modes.

For example, a browser may be configured either manually or through an access agent 180 to access a processing node 110 in a forward proxy mode. In the forward proxy mode, all accesses are addressed to processing node 110.

In another example, an enterprise gateway can be configured so that user requests are routed through the processing node 110 by establishing a communication tunnel between enterprise gateway and the processing node. For establishing the tunnel, existing protocols such as generic routing encapsulation (GRE), layer two tunneling protocol (L2TP), or IP security protocols may be used.

In another example, the processing nodes 110 can be deployed at Internet service provider (ISP) nodes. The ISP nodes can redirect subject traffic to the processing nodes 110 in a transparent proxy mode. Protected systems, such as the enterprise 200, can use a multiprotocol label switching (MPLS) class of service for indicating the subject traffic that is to be redirected. For example, at the within the enterprise an access agent 180 can be configured to perform MPLS labeling.

In another transparent proxy mode example, a protected system, such as the enterprise 200, may identify a processing node 110 as a next hop router for communication with the external servers.

In another transparent proxy mode, a protected system such as the enterprise 200 may insert LSR (Loose Source Routes) routes into the IP options to direct traffic through the processing nodes. LSR indicates the intermediate route nodes to be visited to reach the destination using the IP options header, and thus LSR facilitates the reduction in additional header overhead of encapsulation.

§2.0 Example Detailed System Architecture and Operation

Figure 2:
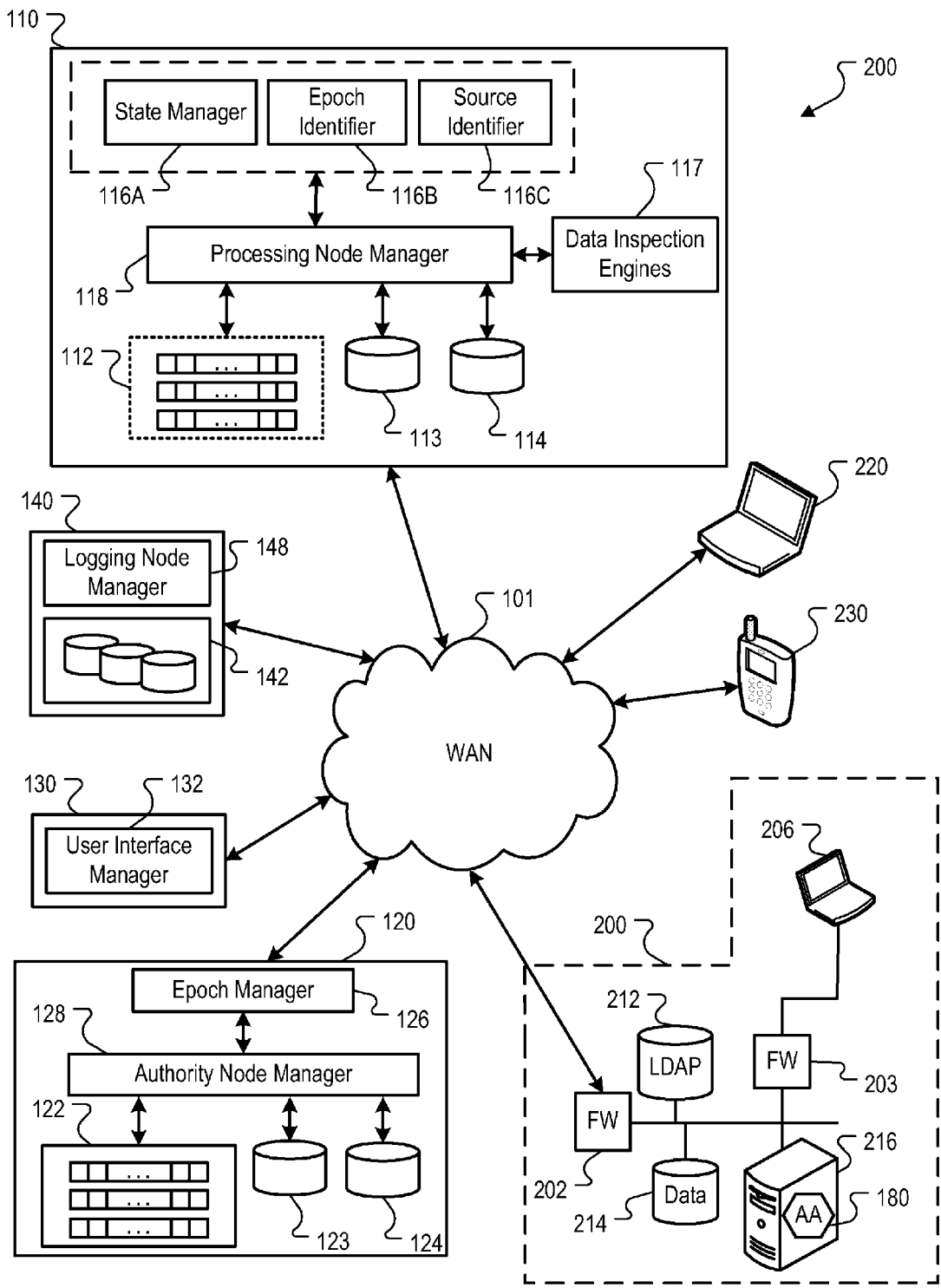
FIG. 2 is a block diagram of the system of FIG. 1 in which the components of FIG. 1 are illustrated in more detail.

FIG. 2 is a block diagram of the system of FIG. 1 in which the components of FIG. 1 are illustrated in more detail. Although only one representative component processing node 110, authority node 120 and logging node 140 are illustrated, there can be many of each of the component nodes 110, 120 and 140 present in the system 100.

A wide area network (WAN) 101, such as the Internet, or some other combination of wired and/or wireless networks, connects in data communication the processing node 110, authority node 120 and logging node 140. The external systems 200, 220 and 230 likewise communicate over the WAN 101 with each other or other data providers and publishers. Some or all of the data communication of each of the external systems 200, 220 and 230 can be processed through the processing node 110.

FIG. 2 also shows the enterprise 200 in more detail. The enterprise 200 can, for example, include a firewall 202 protecting an internal network that can include one or more enterprise servers 206, a lightweight director access protocol (LDAP) server 212, and other data or data stores 214. Another firewall 203 can protect an enterprise subnet that can include user computers 206 and 208 (e.g., laptop and desktop computers). The enterprise 200 may communicate with the WAN 101 through one or more network devices, such as a router, gateway, etc. The LDAP server 104 may store, for example, user login credentials for registered users of the enterprise 200 system. Such credentials can include a user identifiers, login passwords, and a login history associated with each user identifier. The other data 214 can include sensitive information, such as bank records, medical records, trade secret information, or any other information warranting protection by one or more security measures.

In some implementations, an access agent 180 can facilitate authentication functions with a processing node 110, e.g., by assigning tokens for passwords and sending only the tokens to a processing node 110 so that transmission of passwords beyond the network edge of the enterprise is minimized. Other functions and processes can also be facilitated by the access agent 180. The access agent 180 can be implemented on a server or on client devices in the enterprise 200.

The computer device 220 and the mobile device 230 can also store information warranting security measures, such as personal bank records, medical information, and login information, e.g., login information to the server 216 of the enterprise 200, or to some other secured data provider server.

§2.1 Example Processing Node Architecture

In some implementations, the processing nodes 110 are external to network edges of the external systems 200, 220 and 230. Each processing node 110 stores security policies 113 received from the authority node 120 and monitors content items requested by or sent from the external systems 200, 220 and 230. In some implementations, each processing node 110 can also store a detection process filter 112 and/or threat data 114 to facilitate the decision of whether a content item should be processed for threat detection.

A processing node manager 118 can manage each content item in accordance with the security policy data 113, and the detection process filter 112 and/or threat data 114, if stored at the processing node 110, so that security policies for a plurality of external systems in data communication with the processing node are implemented external to the network edges for each of the external systems 200, 220 and 230. For example, depending on the classification resulting from the monitoring, the content item can be allowed, precluded, or threat detected. In general, content items that are already classified as "clean" or not posing a threat can be allowed, while those classified as "violating" can be precluded. Those content items having an unknown status, e.g., content items that have not been processed by the system 100, can be threat detected to classify the content item according to threat classifications.

In some implementations, the processing node 110 can include data inspection engines 117. The data inspection engines 117 can be configured to perform a threat detection processes to classify content items according to a threat classification for a corresponding threat. For example, the data inspection engines can include a virus scanner engine that can classify a content item as infected or clean, a network URL filter that can classify a URL address as allowed or restricted, a data leakage protection (DLP) engine that can identify a content item as secure or leaking, and a dynamic content categorization (DCC) engine that can classify a content item as passed or failed.

The list of the data inspection engines is illustrative only; many other data inspection engines 117 can also be used, as can multiple instances of data inspection engines, e.g., different type data leakage engines implementing different data leakage algorithms. The calling of any particular data inspection engine 117 can be predicated on the type of content item to be threat detected. For example, a URL request from the enterprise 200 may cause the processing node manager 118 to call only the URL filter engine.

In some implementations, the processing node 110 can include a state manager 116a. The state manager 116a can be used to maintain the authentication and the authorization states of users that submit requests to the processing node. Maintenance of the states through the state manager 116a can minimize the number of authentication and authorization transactions that are necessary to process a request. An example of a state manager 116a is described in FIGS. 3-6.

In some implementations, the processing node 110 can include an epoch processor 116b. The epoch processor 116b can be used to analyze authentication data that originated at an authority node 120. The epoch processor 116b can use an epoch ID to further validate the authenticity of authentication data. An example of an epoch processor 116b is described in FIG. 7.

In some implementations, the processing node can include a source processor 116c. The source processor 116c can be used to verify the source of authorization and authentication data. The source processor 116c can identify improperly obtained authorization and authentication data, enhancing the security of the network. An example of a source processor 116c is described in FIG. 7.

Because the amount of data being processed by the processing nodes 110 can be substantial, the detection processing filter 112 can be used as the first stage of an information lookup procedure. For example, the detection processing filter 112 can be used as a front end to a looking of the threat data 114. Content items can be mapped to index values of the detection processing filter 112 by a hash function that operates on an information key derived from the information item. The information key is hashed to generate an index value (i.e., a bit position). A value of zero in a bit position in the guard table can indicate, for example, absence of information, while a one in that bit position can indicate presence of information. Alternatively, a one could be used to represent absence, and a zero to represent presence.

Each content item can have an information key that is hashed. For example, the processing node manager 118 may identify the URL address of a URL requests as the information key and hash the URL address; or may identify the file name and the file size of an executable file information key and hash the file name and file size of the executable file. Hashing an information key to generate an index and checking a bit value at the index in the detection processing filter 112 generally requires less processing time than actually searching threat data 114. The use of the detection processing filter 112 can improve the failure query (i.e., responding to a request for absent information) performance of database queries and/or any general information queries. Because data structures are generally optimized to access information that is present in the structures, failure query performance has a greater effect on the time required to process information searches for very rarely occurring items, e.g., the presence of file information in a virus scan log or a cache where many or most of the files transferred in a network have not been scanned or cached. Using the detection processing filter 112, however, the worst case additional cost is only on the order of one, and thus its use for most failure queries saves on the order of m log m, where m is the number of information records present in the threat data 114.

The detection processing filter 112 can thus improve performance of queries where the answer to a request for information is usually negative. Such instances can include, for example, whether a given file has been virus scanned, whether content at a given URL has been scanned for inappropriate (e.g., pornographic) content, whether a given fingerprint matches any of a set of stored documents, and whether a checksum corresponds to any of a set of stored documents. Thus, if the detection processing filter 112 indicates that the content item has not been processed, then a worst case null lookup operation into the threat data 114 is avoided, and a threat detection can be implemented immediately. The detection processing filter 112 thus complements the threat data 114 that capture positive information.

In some implementations, the detection processing filter 112 can be a Bloom filter implemented by a single hash function. The Bloom filter can be sparse table, i.e., the tables include many zeros and few ones, and the hash function is chosen to minimize or eliminate false negatives which are, for example, instances where an information key is hashed to a bit position and that bit position indicates that the requested information is absent when it is actually present.

§2.2 Example Authority Node Architecture

In general, the authority node 120 includes a data store that stores master security policy data 123 for each of the external systems 200, 220 and 230. An authority node manager 128 can be used to manage the master security policy data 123, e.g., receive input from users of each of the external systems defining different security policies, and can distribute the master security policy data 123 to each of the processing nodes 110. The processing nodes 110 then store a local copy of the security policy data 113.

The authority node 120 can also store a master detection process filter 122. The detection processing filter 122 can include data indicating whether content items have been processed by one or more of the data inspection engines 116 in any of the processing nodes 110. The authority node manager 128 can be used to manage the master detection processing filter 122, e.g., receive updates from a processing nodes 110 when a processing node 110 has processed a content item and update the master detection processing filter 122. In some implementations, the master detection processing filter 122 can be distributed to the processing nodes 110, which then store a local copy of the detection processing filter 112.

In some implementations, the authority node 120 can include an epoch manager 126. The epoch manager 126 can be used to generate authentication data associated with an epoch ID. The epoch ID of the authentication data is a verifiable attribute of the authentication data that can be used to identify fraudulently created authentication data. An example of a epoch manager 126 is described in FIG. 7.

In some implementations, the detection processing filter 122 can be a guard table. The processing node 110 can, for example, use the information in the local detection processing filter 112 to quickly determine the presence and/or absence of information, e.g., whether a particular URL has been checked for malware; whether a particular executable has been virus scanned, etc.

The authority node 120 can also store master threat data 124. The master threat data 124 can classify content items by threat classifications, e.g., a list of known viruses, a list of known malware sites, spam e-mail domains, etc. The authority node manager 128 can be used to manage the master threat data 124, e.g., receive updates from a processing nodes 110 when a processing node 110 has processed a content item and update the master threat data 124 with any pertinent results. In some implementations, the master threat data 124 can be distributed to the processing nodes 110, which then store a local copy of the threat data 114.

In some implementations, the authority node 120 can also monitor the health of each processing node 110, e.g., the resource availability in each processing node 110, detection of link failures, etc. Based on the observed health of each process node 110, the authority node 120 can redirect traffic among processing nodes 110 and/or balance traffic among the processing nodes 110. Other remedial actions and processes can also be facilitated by the authority node 110.

§3.0 States of a User in the State Management System

Figure 3:
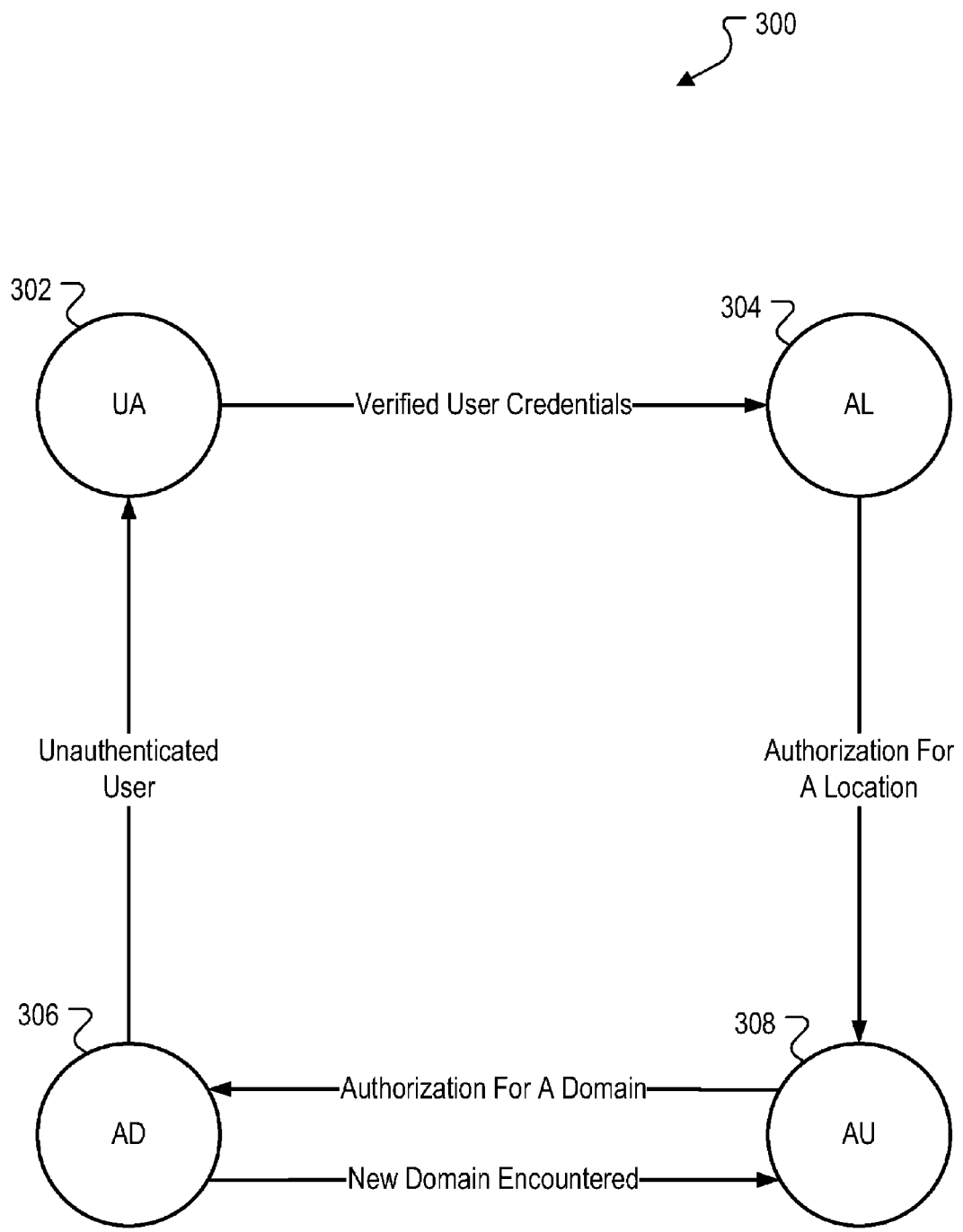
FIG. 3 is a state diagram of the different states maintained by a state manager.

FIG. 3 is a state diagram 300 of the different states maintained by the state manager 116a. Each state of the state diagram 300 identifies a different level of authentication and authorization of a user. The state manager 116a can maintain these different states and process requests to the processing node 110 based on the state of the user.

A request to the processing node 110 is processed by the stage manager 116a based on the level of authentication and/or authorization the user has obtained. In some implementations, authentication refers to the validation of the identity of the user. User credentials can be used to validate the identity of a user. For example, a user may be authenticated by supplying a user name and password. Authorization can refer to the eligibility of a validated user to complete an action. For example, an authenticated user can may be eligible to request content from domains that provide informational content, but not from domains associated with file sharing. Thus, the user is authorized for the domains associated with provision of informational content, but not for the domains associated with file sharing.

Different levels of authentication and authorization are identified by the different states in the state diagram 300. If the user has not obtained any level of authentication or authorization, the user is assigned to the unauthenticated (UA) state 302. The UA state 302 means that the user (or a client device being used by the user) has not provided any verified credentials to the state manager 116a, and thus the user must be authenticated before the request can be processed. The user can obtain authentication by providing credentials to the state manager 116a.

If the state manager 116a is able to verify the user credentials, the user has obtained authentication and can be assigned to the authenticated for a location (AL) state 304. A user in the AL state 304 is authenticated to transmit requests to the domain of the processing node 110. Thus, the state manager 116a has validated the identity of the users in the AL state 304 and can attempt to process requests from the users. However, the authorization level of a user in the AL state has not been determined. Thus, a user must obtain authorization before it can request content from the processing node 110.

In some implementations, the AL state 304 is a transient state that is reached after the user has been authenticated, but before the user has been authorized to request content from any domain. Thus, in some implementations, the AL state 304 is maintained through the component responsible for the authentication, e.g., the access agent 180 and/or the authority node 120. Accordingly, state manager 116a may not be responsible for assigning a user to the AL state 304. However, the state manager 116a can identify when the user is in the AL state 304 and obtain the authorization necessary to move the user to the authenticated user state 306.

When a user is in the AL state 304 obtains authorization to request content from the processing node 110, the state manager 116a assigns the user to the authenticated user (AU) state 306. The AU state 306 means that the identity of the user has already been validated, and that processing node 110 is able to determine what level of authorization the user has. The processing node 110 can authorize requests of the user. The AU state does not enable the user to request content directly from domains, such as the domain of a target site. In order for the user to obtain content from the domain directly rather than through the processing node 110, the user must be authorized for the specific domain that is subject to the request.

Once the user is authorized for a specific domain, the user can be assigned to the authorized for a domain (AD) state for the specific domain. The AD state 306 means that the identity of the user has already been validated, the validated user is an authorized user of the processing node 110 such that the processing node 110 can determine whether a request is to be allowed, and that processing node 110 has already determined the validated user is authorized to request content from the authorized domain.

The state diagram 300 identifies how the state manager 116a maintains the states of the user. The state manager 116a does not require each request transmitted by the user to originate in the UA state 302. Rather, the state manager 116a maintains the authorization state of the user by interpreting data that is transmitted with each request. The data (or lack of data) transmitted by the user can identify the user as in the UA state 302, the AL state 304, the AU state 306, or the AD state 308. Accordingly, the state manager 116a can identify the state of the user submitting the request, and the effort to authenticate and authorize users is minimized.

For example, when a new domain is encountered through a request, the state of the user will not be in the AD state for the new domain. However, the state manager 116a does not default the user to the UA state 302. Rather, the state manager 116a determines if the user that submitted the request is in AU state 306 or the AL state 304. Depending on what state the user is in when the request is received, the state manager 116a can minimize the transactions needed to authorize the user's request.

§4.0 The State Management System

Figure 4:
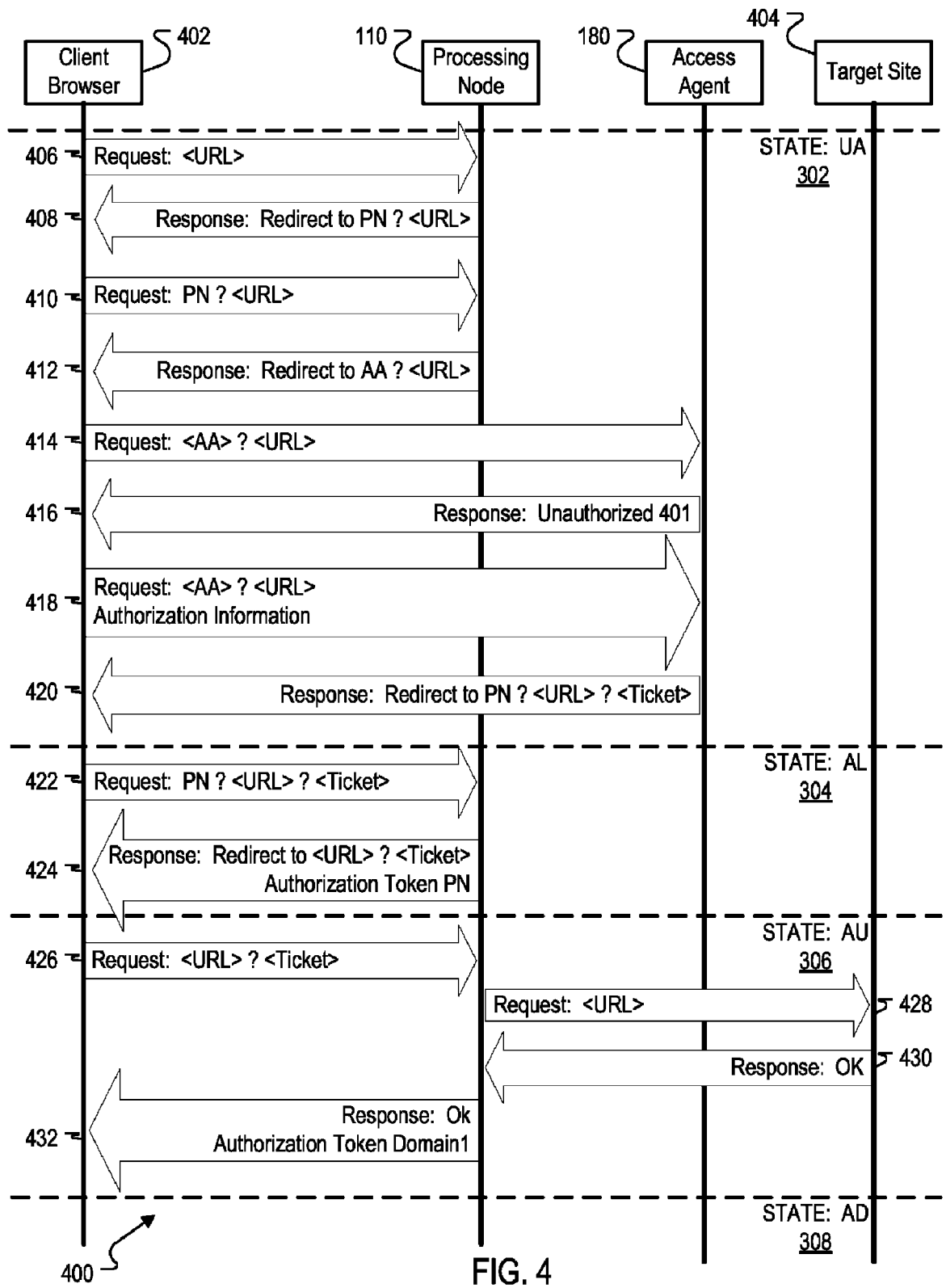
FIG. 4 is an example timing diagram of the management of unauthenticated and unauthorized requests by the state manager.

FIG. 4 is a timing diagram 400 of the management of an unauthenticated and unauthorized request by the state manager 116a. In the diagram 400, a client browser 402 submits a request 406, e.g. an HTTP request that includes a Uniform Resource Locator (URL) for content accessible at a domain, e.g., target site 304. The state manager 116a of the processing node 110 determines whether to allow the request 406 based on the state of the user that submitted the request. For example, the state manager 116a can allow a request for content at a domain if the user is in a state that is authorized to request content from that domain.

The state manager 116a can determine the state of the user based on the data transmitted with the request by the client browser 402. The state manager 116a can make this determination because with any request to a domain, the client browser 402 transmits data applicable to the domain. Included in the data transmitted is authentication and authorization data for the domain that was provided by the state manager 116a. For example, when a user visits an Email Site on Domain E, the client browser 402 transmits any authentication and/or authorization data provided by the state manager 116a for the Domain E. One method of storing data to ensure that the data for a domain is transmitted to that domain with each request is by storing the data as an http cookie assigned to the domain. Other methods of storing the data can also be used.

Based on the state of the user, the state manager 116a can determine whether to allow the request, or whether to obtain additional authentication and/or authorization. Because the client browser 402 is the interface for the user, the state of the user is equivalent to the state of the client browser 402 that submitted the user request. Thus, in the diagram 400, the state of the client browser 402 is used to refer to the state of the user.

§4.1 Identification of the Unauthenticated (UA) State

A request from a client browser 402 in the UA state 302 is not processed by the processing node 110 because the user has not been authenticated. In some implementations, the state manager 116a can determine that the client browser 402 is in the UA state 302 by determining that the client browser 402 is not in the AL state 304, the AU state 306 or the AD state 308. In some implementations, the state manager 116a must first determine that the client browser 402 is not in the AD state 308, then the AU state 306. This method is used because the AD state 308 inherently includes the AU state 306.

The state manager 116a can determine if the client browser 402 is in the AD state 308 for a domain by identifying domain authorization data submitted with a request for the domain. The domain authorization data can be data that indicates that the client browser 402 has been authorized by the state manager 116a to submit requests to the domain of a target site. If the client browser 402 is in the AD state 308 for the domain of the requested content, the client browser 402 provides domain authorization data with its request. If there is no domain authorization data submitted with a request for content from a domain, the client browser 402 is not in the AD state 308 for that domain.

For example, the client browser 402 can submit a request 406 for content at the target site. Because the request 406 is directed to the target site, the request 406 includes the URL of the target site. However, no data is passed in the request 406 that indicates that the client browser 402 is authorized to visit the domain of the target site. Thus, the state manager 116a can determine that the client browser 402 is not in the AD state 308 for the domain of the target site.

After determining that the client browser 402 is not in the AD state 308, the state manager 116a can determine if the client browser 402 is in the AU state 306. The client browser 402 can be determined to be in the AU state 306 if the client browser 402 can provide authorized user data to the state manager 116a. The authorized user data can be data that indicates that the client browser 402 has been authorized by the state manager 116a to submit requests to the domain of the processing node 110. The authorized user data can be used by the processing node to identify the user policy of the user. The authorized user data is associated with the domain of the processing node. The state manager 116a can solicit this authorized user data by sending the client browser 402 a redirect request 408.

For example, the state manager 116a submits the redirect response 408 to the client browser 402 after determining that the client browser 402 is not in the AD state 308 for the requested domain. The response 408 requires the client browser 402 to submit a request 410 for the target site 404 to the state manager 116a of the processing node 110. The request 410 seeks the contents of the target site 404 from the processing node 110, thus the original URL of the target site 404 is submitted as a query parameter of the request 410. Because the request is directed to the processing node 110, the target domain of the request 410 is the domain of the processing node 110. The state manager 116a identifies any data submitted with the request 410 to the domain of the state manager 116a. The state manager 116a can determine that the client browser 402 is not in the AU state 306 because no authorized user data is submitted from the client browser 402 with the request 410 to the processing node 110.

If the state manager 116a determines that the client browser 402 is not in the AU state 306, then the state manager 116a determines if the client browser 402 is in the AL state 304. Although in some implementations, the AL state 304 is a transient state that is maintained by the node responsible for authentication, e.g., access agent 180, the state manager 116a can still determine when the client browser 402 is assigned to the AL state 304 by an access agent.

The state manager 116a can determine that the client browser 402 is in the AL state when the client browser 402 submits a request with authentication data, e.g., a user authentication ticket. The user authentication ticket can be data that indicates that the client browser 402 has been authenticated by the access agent 180. In some implementations, the user authentication ticket can be used to identify the user policy of the client browser 402.

For example, the state manager 116a can determine that neither the request 406 nor the request 410 included any authentication data. Thus, the state manager 116a can determine that the client browser is not in the AL state 304. Based on this the state manager 116a can determine that the client browser is in the only remaining state, the UA state 302.

§4.2 Transition from the UA State to the Authorized for a Location (AL) State

If the state manager 116a has identified the client browser 402 to be in the UA state 302, the processing node 110 cannot process any request from the client browser 402. Instead, the client browser 402 must obtain authentication for the processing node 110 to process the requests from the client browser 402. If the client browser 402 obtains authentication and is able to submit the obtained authentication data to the state manager 116a, the state manager 116a can modify the state of the client browser 402 to the AL state 304. The state manager 116a can trigger the authentication by redirecting the client browser 402 to the access agent 180.

For example, upon identifying the client browser 402 as in the UA state 302, the state manager 116a can submit a redirect response 412 to the client browser 402 to obtain authentication. The redirect response 412 requires the client browser 402 to submit a request 414 to the access agent 180. The access agent 180 can respond to a request 414 by notifying the client browser 402 that it is not authenticated. In a response 416 to the request 414, the access agent 180 can request authentication information from the client browser 402. The client browser 402 can prompt the user for authorization, and the user credentials can be passed to the access agent through a request 418. The access agent 180 receives the request 418, and if the user credentials are verified, the client browser 402 can be authenticated. Where a client browser 402 is authenticated, the access agent 180 can transmit authentication data back to the client browser 402.

In some implementations, after the access agent 180 authenticates the user credentials, the access agent 180 can obtain the user policy associated with the user credentials in the form of the authentication data, provided by the authority node 120 of FIG. 1, as discussed in Section 5.0 and Section 5.1. The access agent 180 can transmit the authentication data back to the client browser 402.

The client browser 402 now possesses the authentication data, and is in the AL state 304.

§4.3 Transition from the AL State to the Authorized User (AU) State

Once the client browser 402 is in the AL state, the state manager 116a can attempt to authorize the client browser 402. Because the AL state 304 is a transient state encountered prior to the AU state 306, the access agent 180 provides the authentication data to the client browser 402 as a parameter of a redirect response 420. The state manager 116a can verify the identity of the client browser 402 with the authentication data, and attempt to authorize the client browser 402. If the client browser 402 is authorized, the state manager 116a assigns the client browser 402 to the AU state 306.

For example, the client browser 402 can receive from the access agent 180 a redirect response 420 to the processing node 110. The redirect response 420 requires the client browser 402 to present the authentication data to the state manager 116a of the processing node 110. The state manager 116a of the processing node 110 receives the redirected request from the client browser, e.g. request 422. Because the request 422 includes authentication data, the state manager 116a can determine that the client browser is in the AL State 304. The state manager 116a can verify the use data in the user authorization ticket to determine if the client browser 402 is an authorized user of the state manager 116a. If the client browser 402 is an authorized user, the state manager 116a can generate authorized user data based on the authentication data.

The client browser 402 now possesses the authorized user data, and is in the AU state 306.

§4.4 Transition from the AU State to the Authorized for a Domain (AD) State

Once in the AU state 306, the client browser 402 is authorized to submit requests to the processing node 110. Thus, a request cannot be directly to the target site 404, but rather the request is directed to the processing node 110 with the target site 404 as a query parameter. The processing node 110 can determine whether the client browser is authorized to request content from the target site 404, e.g., by examining the policy data 113 that specifies access privileges for the user. If the client browser 402 is authorized, the processing node 110 redirects the request of the client browser 402 back to the target site 404, with domain authorization data that indicates the client browser is authorized.

For example, after the state manager 116a of the processing node 110 provides the authorized user data in the response 424, the client browser 402 is in the AU state 306. Because the initial request 406 has still not been processed, as part of the response 424, the processing node 110 instructs the client browser 402 through a redirect request to submit a request to the target site 404. The redirected request, e.g., request 426, is directed to the target site 404 of the original URL, and includes the domain authorization data as a query parameter.

The redirected request from the client browser 402 is directed to the target site 404, but the processing node 110 still examines every request. Because the request has the domain authorization data as a query parameter, the processing node 110 allows the request after stripping the query parameter that include the domain authorization data, e.g., the data passed in the ticket query parameter of the request 426. The response from the target site 404 is also communicated through the processing node 110.

For example, the request 426 redirected the client browser 404 to the target site 404. The processing node 110 forwards the request to the target site 404 through request 328. The response from the target site 404 is sent back to the processing node 110, e.g., response 330.

Upon receiving the response from the target site 404, the state manager 116a transmits the domain authorization data back to the client browser 402 in a format that can be stored by the client browser and associated with the target site 404. For example, the response 432 from the processing node 110 can send the domain authorization data back as an http cookie for the domain of the target site 404. The client browser 402 now possesses the domain authorization data for the domain of the target site 404, and is in the AD state 308 for the domain.

§4.5 Subsequent Requests for a Domain from the AD State

Figure 5:
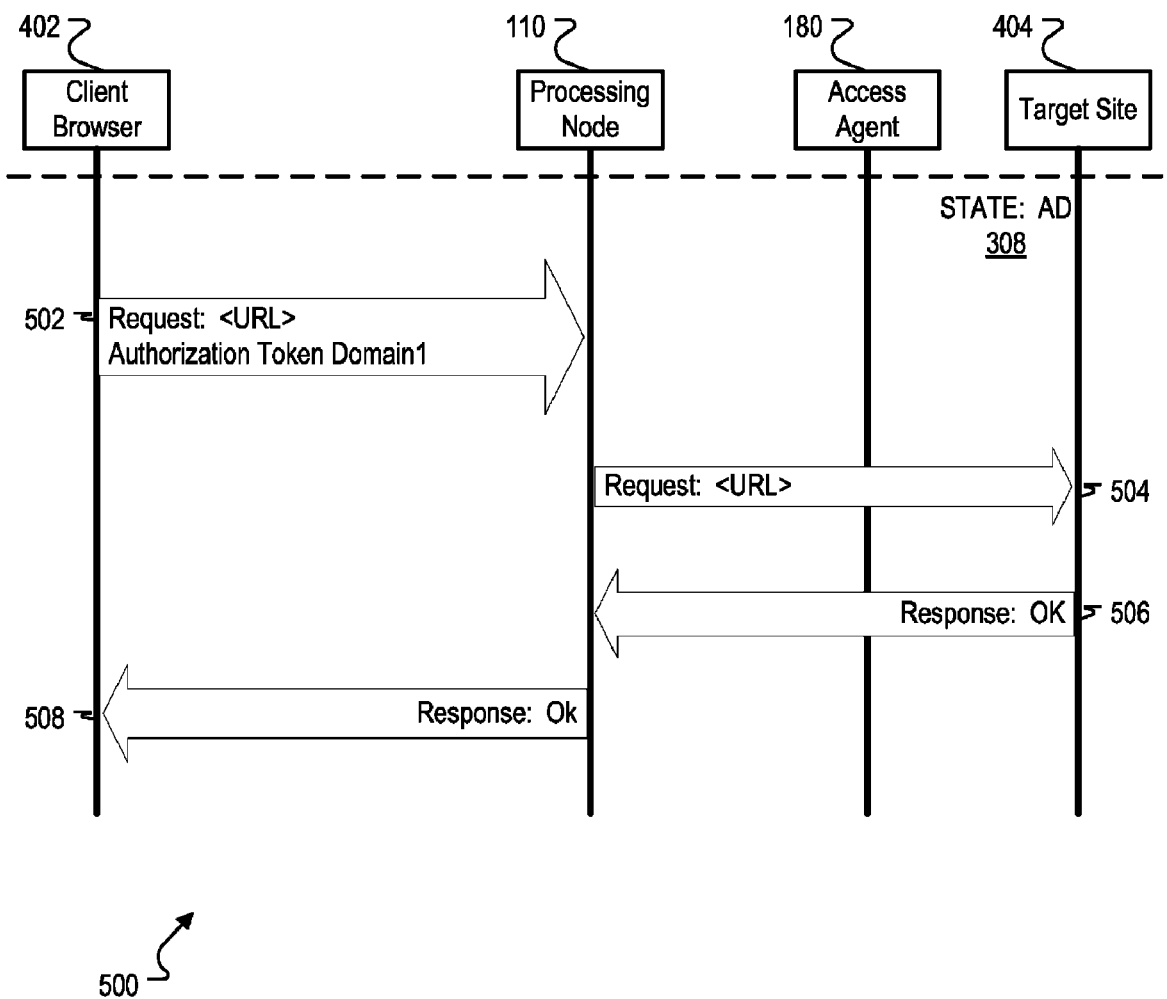
FIG. 5 is an example timing diagram of the management of a subsequent request to an authorized domain by the state manager.

FIG. 5 is an example timing diagram 500 of the management of a subsequent request to an authorized domain by the state manager 116a. In the realization 500, the processing node 110 processes a request for a domain from a client browser 402 in the AD state 308 for the domain. The processing node 110 is able to process the request without requesting additional authentication or authorization from the client browser.

After the client browser 402 is in the AD state 308 for a domain, the client browser 402 can receive a subsequent request for the target site 404 on the same domain. The client browser 402 can also receive a subsequent request for a different target site on the same domain. The state manager 116a of the processing node 110 can recognize that the client browser 402 is in the AD state 308 based on the data passed with the subsequent request.

For example, the client browser 402 may have obtained authorization to visit Company A Shopping Site on Domain 1. Thus, the client browser 402 has stored domain authorization data for Domain 1. Request 502 can be a subsequent request to the Company A Shopping Site on Domain 1. Alternatively, the request 502 can be a subsequent request to a different site on the Domain 1, e.g., Company A Consumer Reviews Site on Domain 1. Because the domain authorization data is associated Domain 1, for either of these requests the client browser 402 can submit the domain authorization data with the request. The state manager 116a can determine that the client browser 402 is in the AD state 308 for Domain 1 because the client browser 402 submitted domain authorization data with the request.

Once the state manager 116a identifies the request as a request from a client browser in the AD state 308, the state manager 116a allows the request without further authorization or authentication. For example, because the client browser is in the AD state 308 for Domain 1, the state manager 116a forwards a request for the URL to the target site 404, e.g., request 504, after stripping the domain authorization data, e.g., the data of the Authorization Token for Domain 1. The target site 404 can then respond to the client browser 402 through the processing node 110, e.g., response 506 and response 508.

§4.6 Subsequent Requests for a Domain from the AU State

Figure 6:
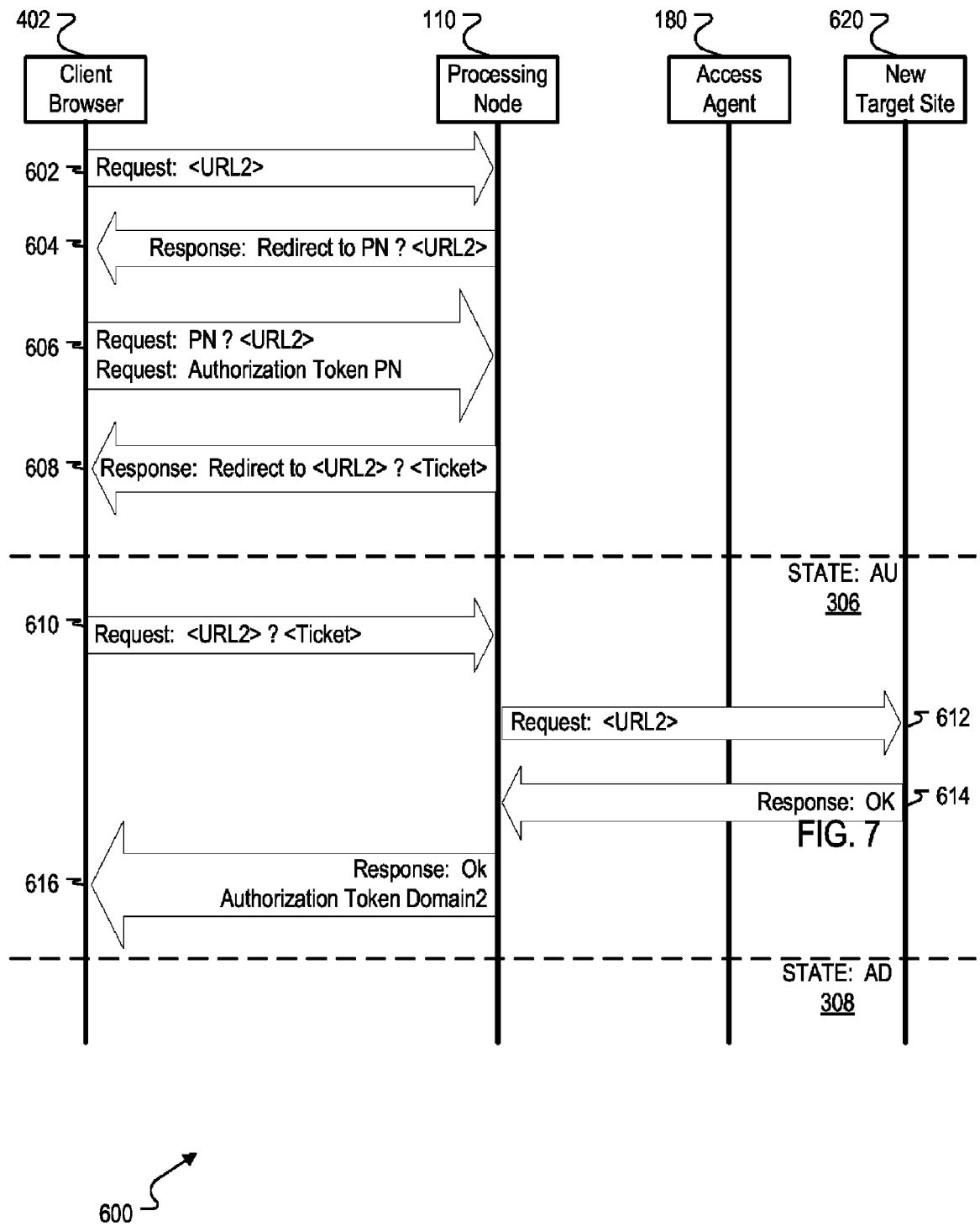
FIG. 6 is an example timing diagram of the management of a request to an unauthorized domain by an authorized user by the state manager.

FIG. 6 is an example timing diagram 600 for the management of a request to an unauthorized domain by an authorized user by the state manager 116a. In the realization 600, the processing node 110 processes a request for a domain from a client browser in the AU state 306. The processing node 110 is able to process the request without requesting authentication from the client browser, and the authorization is obtained in one transaction with the processing node.

When the client browser 402 is in the AD state 308 for a domain, the client browser 402 can request content from a target site 608 that is on a different domain than the domain of the AD state 308. The client browser 402 can also be in the AU state 306 only, and not in the AD state 308 for any domain. For example, the client browser may be in the AD state 308 for Domain 1 when the client browser 402 submits a request for content from Domain 2. Alternatively, the client browser 402 can be in the AU state 306 only and not in the AD state 308 for any domain.

In either of these scenarios, the state manager 116a of the processing node 110 can recognize that the client browser 402 is not in the AD state 308 for the requested domain of target site 620 based on the data passed with the request. For example, because the client browser 402 is not in the AD state 308 for the Domain 2, the client browser 402 does not have any domain authorization data to submit with the request 602. Based on the lack domain authorization data for Domain 2 submitted with request 602, the state manager 116a of the processing node 110 can determine that the client browser 402 is not in the AD state 308 for the Domain 2.

The state manager 116a can then determine whether the client browser 402 is in the AU state by soliciting domain authorization data for the domain of the state manager 116a, e.g., the domain of the processing node 110. For example, the state manager 116a can send a response 604 to the client browser 402, which requires the client browser 402 to send a redirected request to the processing node 110. Because the client browser 402 has authorized user data for the domain of the processing node 110, the client browser 402 can submit the authorized user data with redirected request 606. Based on the authorized user data submitted with the request 606, the state manager 116a can determine that the client browser 402 is in the AU state 306.

At this point, the state manager 116a can handle the request from the client browser 402 as it would any request from a client browser in the AU state 306. The state manager 116a can redirect the client browser 402 to submit a request to the target site 620 with the domain authorization data passed as a query parameter. For example, the state manager 116a can send response 608 back to the client browser 402. The response 608 redirects the client browser 402 to request the content directly from the target site 606, e.g., Company B Site on Domain 2.

The state manager 116a can process the request, and forward it to the target site 606. For example, the client browser 402 can submit the request 610 to the Company B Site on Domain 2 as required by the response 608. The state manager 116a at the processing node 110 can process the request 610, and forward it to the target site 606 as request 612.

The target site 606 can respond back to the client browser 402 through the processing node 110, and the state manager 116a can assign the client browser 402 to the AD state 308 for the domain of target site 606. For example, the Company B site on Domain 2 can send response 614 to the client browser 402. The processing node 110 receives the response 614, and forwards the response as response 616. The state manager 116a can submit the domain authorization data for Domain 2 with the response 616 in the form of an http cookie. Other forms to transmit the domain authorization data can also be used.

In addition to passing authorization data for a domain, the client browser 402 can pass data that is associated with the domain but that is not authentication or authorization data created by the processing node 110. This authentication or authorization data is not data that is generated at the target domain, but rather that is generated either by or for the state manager 116a. For example, where the target site is a shopping site, the client browser 402 can store as the contents of a shopping cart for the shopping site. The contents of the shopping cart can be passed by the client browser 402 as an http cookie with each request to the domain, along with domain authorization data for that domain. However, the http cookie for the shopping cart was generated at the domain of the target site, and is not considered authentication or authorization data. The domain authorization data for that domain in the request is stripped by the processing node 110, and thus the target site does not receive the domain authorization data. Accordingly, in some implementations, the domain authorization data for each domain is only transmitted between the processing node 110 and the client browser 402.

§5.0 Theft and Fraud Prevention

The authentication and/or authorization data submitted by the client browser 402 with each request determines whether the client browser 402 can request content from a target site. Without authentication and authorization data, a client browser 402 cannot request content through the network. However, unauthorized client browsers may still attempt to obtain unauthorized access to the network. For example, the data can be subject to a replay attack that can compromise the security of the network. In particular, an unauthorized client browser can either attempt to fraudulently create the authentication and/or authorization data, or attempt to utilize authentication and/or authorization data that was intended for a different client browser. The incidents of replay attacks can be minimized by identifying fraudulently created authentication or authorization data and identifying the theft of authentication or authorization data. In some implementations, the epoch manager 126, the epoch processor 116*b* and the source processor 116*c* can be used to minimize these kinds of replay attacks.

Figure 7:
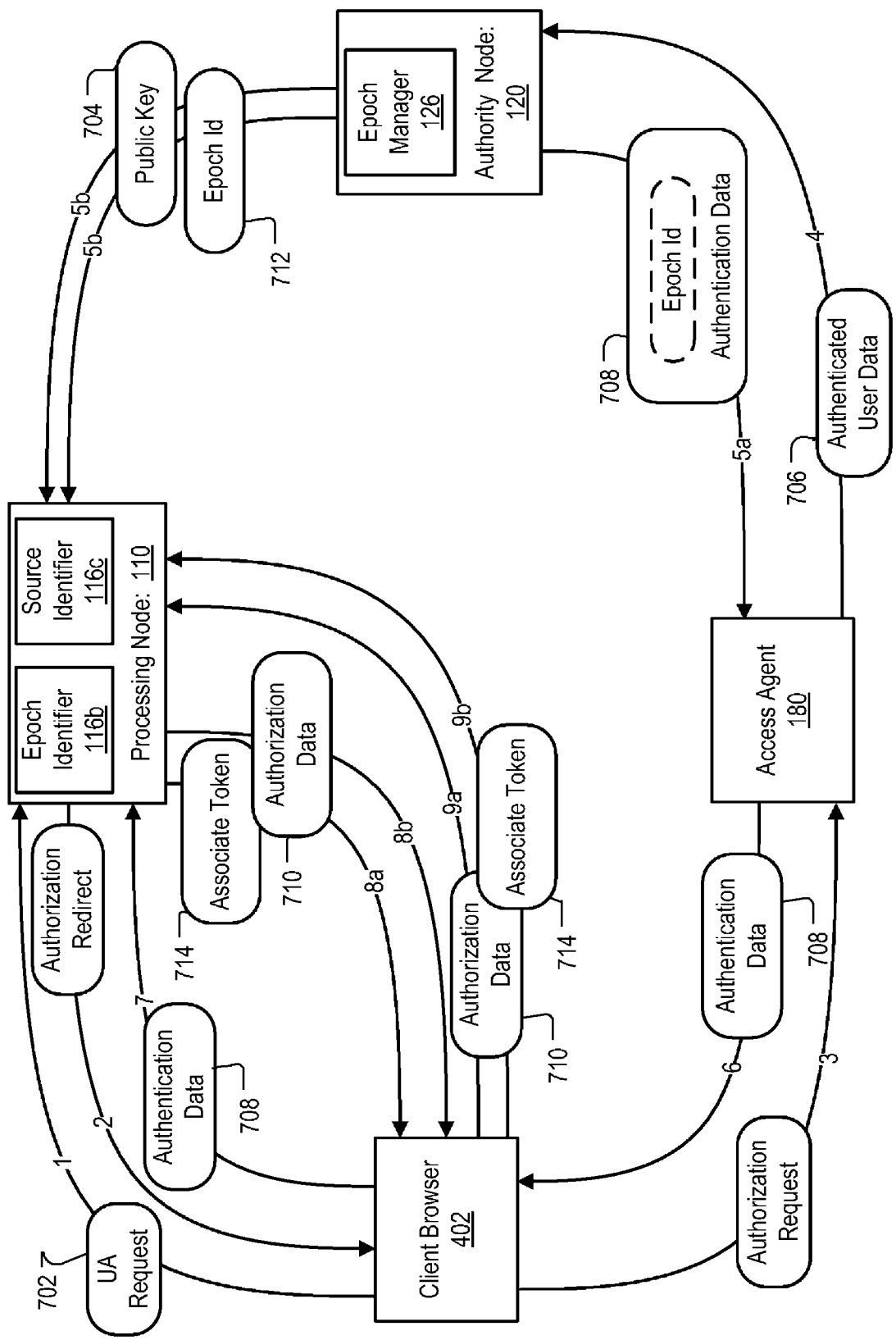
FIG. 7 is an example communication flow across a secured network.

FIG. 7 is an example communication flow 700 across a secured network. In the diagram 700, authentication and authorization data is passed through a network that utilizes an epoch manager 126, an epoch processor 116*b*, and a source processor 116*c* to minimize the replay attacks. The epoch manager 126 and the epoch processor 116*b* can be used to identify fraudulently generated authentication or authorization data. The source processor 116*c* can be used to identify the incidents of theft of authentication or authorization data.

§5.1 Fraud Prevention

In some implementations, authentication data 706 can be generated by the authority node 120 when the client browser 402 requests authentication. For example, if the client browser 402 submits an unauthenticated request 702 to the processing node 110, the processing node 110 may require the client browser 402 to obtain authentication. The processing node 110 can redirect the client browser 402 to the access agent 180, which can authenticate the user. In turn, the access agent 180 can provide the authority node 120 with the authenticated user data 706, e.g., authorized user credentials. For example, if a client browser 402 provides the access agent with a user ID and password that is validated, the access agent can provide the validated user ID to the authority node.

The authority node 120 can generate authentication data 708, e.g., a user authentication ticket, based on the authenticated user data 706 provided to the authority node. The authentication data 708 can be transmitted through a network and allows the processing node 110 to identify the authenticated user from the authentication data 708, and in some implementations, determine the user policy associated with the authenticated user data 706.

§5.1.1 Generation of Authentication Data with an Epoch Manager

In some implementations, the epoch manager 126 can be used by the authority node 120 to encrypt the authentication data 708 using a public epoch key of an epoch key pair. The epoch manager 126 can reduce the ability of an unauthorized client browser to synthetically generate the encrypted authentication data 708 by maintaining the epoch key pair only for a defined epoch. An epoch can be a period of time, a number of processed requests, or any other measurement of a period. An epoch ID 712 can be any quasi-unique or unique value that identifies a specific epoch.

For each epoch, the authority node creates an epoch key pair. The epoch key pair includes a private epoch key and a public epoch key, e.g., public key 704. Data encrypted by a private epoch key can only be decrypted by the public epoch key for the same epoch as the private epoch key. At the expiration of the epoch, a new epoch key pair is created that is used to encrypt the authentication data 708.

For example, during epoch 1, the authority node 120 creates epoch key pair 1. The authority node 120 can use the private epoch key of epoch 1 to generate encrypted authentication data 708 during epoch 1. The authentication data 708 generated during epoch 1 can only be decrypted by the public epoch key of epoch 1.

In some implementations, the epoch manager 126 modifies the authenticated user data 706 before generating the authentication data 708. The epoch manager 126 can associate an epoch ID 712 for the current epoch with the authenticated user data 706 to generate associated authenticated user data. The associated authenticated user data can be used to create an encrypted authentication data 708 that is associated with the current epoch. Thus, the authentication data 708 can be associated with the epoch during it was created. For example, if the authenticated user data is "UserA," during epoch 1 the associated authenticated user data would be a combination of the authenticated user data and the epoch ID, e.g., "UserA1." Similarly, the associated authenticated user data during epoch 2 would be "UserA2." The associated authenticated user data can be encrypted to generate the authentication data 708. Other combination schemes can also be used.

Thus, in some implementations, the authentication data 708 can only be decrypted by the public epoch key, e.g., public key 704, for the same epoch as the private epoch key that was used to encrypt the authenticated user data. Additionally, after the authentication data 708 is decrypted, the resulting data can be the authenticated user data 706 followed by an epoch ID 712 of the period in which the authentication data 708 was encrypted. This generation of authentication data 708 that is associated with an epoch reduces the ability to create fraudulent authentication data 708. Because the authentication data 708 can be the basis of the authorization data 710, e.g., the authorized user data and the domain authorization data, the authorization data is also difficult to fraudulently create. Fraudulently created authentication data 708 or authorization data 710 can be identified by the epoch processor 116*b*.

§5.1.2 Handling of Authentication Data Generated by an Epoch Manager

The epoch processor 116*b* can be at the processing node 110, and thus can be used to identify fraudulently created authentication data 708 or authorization data 710 submitted with a request.

After the epoch manager 126 generates an epoch key pair, the epoch manager 126 transmits the public epoch key 704 of the epoch key pair to the epoch processor 116*b* of the processing node 110. The epoch ID 712 of the public epoch key 704 is also transmitted to the epoch processor 116*b*. For example, when the epoch manager 126 generates an epoch key pair during epoch 1, the public epoch key generated during epoch 1 is transmitted to the epoch processor 116*b* with the epoch ID 1 as an attribute of the public epoch key. At the same time, the authority node 120 transmits the authentication data 708 back to the access agent 180 to be stored by the client browser 402.

When the processing node 110 receives authentication data 708 or authorization data 710, the epoch processor 116b of the processing node 110 analyzes the data. The epoch processor 116b attempts to decrypt the data using a valid public epoch key stored at the epoch processor 116b. For example, the epoch processor 116b can try to decrypt authentication data 708 or authorization data 710 using the public epoch key 704 for epoch 1.

In some implementations, a valid public epoch key is the current public epoch key 704 stored at the epoch processor 116b. Alternatively, in some implementations, a public epoch key is a valid public epoch key if the public epoch key was generated within some defined range of epochs of the current public epoch key. This epoch window allows authenticated users that have not accessed the processing node 110 for a time period less than the epoch window to not be required to re-authenticate if their current authentication data 708 or authorization data 710 is encrypted according to a previous epoch within the epoch window. The epoch processor 116b can attempt to decrypt the data using any valid public epoch key. For example, if the range of valid epochs is three epochs, then during the epoch 3, the public epoch keys of epoch 2 and epoch 1 remain valid. Thus, If the range of valid epochs is three epochs, and the epoch processor 116b can attempt to decrypt the data using the public epoch key of the epoch 1, epoch 2, and epoch 3, even though the current epoch is epoch 3. However, the public epoch key of epoch 1 is not used to decrypt the data when the current epoch is the epoch 4.

Some fraudulently created authentication data 708 or authorization data 710 can be identified by failed decryptions. However, it is possible for an unauthorized user to fraudulently generate authentication data 708 or authorization data 710 that is decrypted by a valid public epoch key. In this scenario, the epoch processor 116b will attempt to parse the decrypted value into user authorization data and an epoch ID.

If the epoch processor 116b is able to parse an epoch ID from the decrypted data, the epoch ID parsed from the decrypted value must match the epoch ID attributed to the public epoch key that was used to decrypt the data. If the user epoch ID parsed from the decrypted data does not match the key epoch ID, i.e., the epoch ID attribute to the public epoch key, the decryption is not successful and the epoch processor 116b does not accept the authorization data 708 or authentication data 710.

For example, an unauthorized client browser may have been able to create encrypted authorization data that when decrypted by the public epoch key of epoch 5, produces an authenticated user ID "UserA." However, the value "UserA" cannot be parsed to identify the epoch ID of "5." Thus, the decryption by the epoch processor 116b fails. Similarly, if the encrypted authorization data can be decrypted by the public epoch key 704 of epoch 5 to produce the user ID "UserA1," the user epoch ID parsed from the decrypted data is 1. The user epoch ID does not match the epoch ID of 5 that was attributed to the public key that was used to decrypt the data. Thus, the decryption by the epoch processor 116b fails.

In some implementations, if the decryption is successful by using a public epoch key that is valid, but not the current public epoch key, the epoch processor 116b can modify the authentication data 708 to associate the authentication data 708 with the current public epoch key. Similarly, any authorization data 710 based on the authentication data 708 can be modified as well. This modification of the epoch associated with the authentication and authorization data can be done by the epoch processor 116b without requiring a reauthentication by the client browser.

For example, the epoch processor 116b can receive authentication data 708 or authorization data 710 that can be successfully decrypted by the public epoch key of epoch 1. If the current public epoch key is of epoch 2, the epoch processor 116b can request an updated authentication data 708 for the epoch 2 from the access agent 180 or the authority node 120. The epoch processor 116b can then reissue the authentication data 708 or authorization data 710 for the user for the current epoch.

§5.2 Theft Prevention

An unauthorized client browser can attempt to intercept authorization data 710 intended for the client browser 402 or the processing node 110. The unauthorized client browser can then attempt to transmit the improperly obtained authorization data 710 on behalf of the unauthorized client, in an attempt to bypass the authorization requirements of the processing node 110. This type of theft can be prevented using the source processor 116c of the processing node 110. The source processor 116c utilizes an associate token 714 to maintain the source an initial request for authentication, and can require subsequent requests for authorization to originate from the same source as the initial request.

In some implementations, the source processor 116c can identify the source of the authentication data 708 received by the processing node. For example, when the authentication data 708 is transmitted by the client browser 402 to the processing node 110, a unique communication address of the client browser 402 can be determined by the source processor 116c, e.g., the port number the client browser 402 communicates on, the MAC address of the client browser 402, etc.

The source processor 116c can associate the communication address identified by the source processor 116c with the authentication data 708 that was transmitted in the initial request. For example, the source processor 116c can create a token containing the port number the client browser 402 uses to communicate to the processing node 110, and the authentication data 708. The data associated together by the source processor 116c can be encrypted to generate an associate token 714. The associate token 714 can be provided to the client browser 402 by the processing node 110, along with the authorization data 710 that is provided by the processing node 110.

Subsequent requests to the processing node 110 must contain the associate token 714. If the associate token 714 is not transmitted with a subsequent request, authorization is not granted by the processing node 110. If the associate token 714 is transmitted with the subsequent authorization, but the communication address specified in the associate token 714 does not match the communication address from which the subsequent request was transmitted, authorization is not granted. The source processor 116c may only grant authorization where an authorized request is sent from the same communication address that requested the authentication.

§6.0 Example Processes for Theft Prevention

Figure 8A:
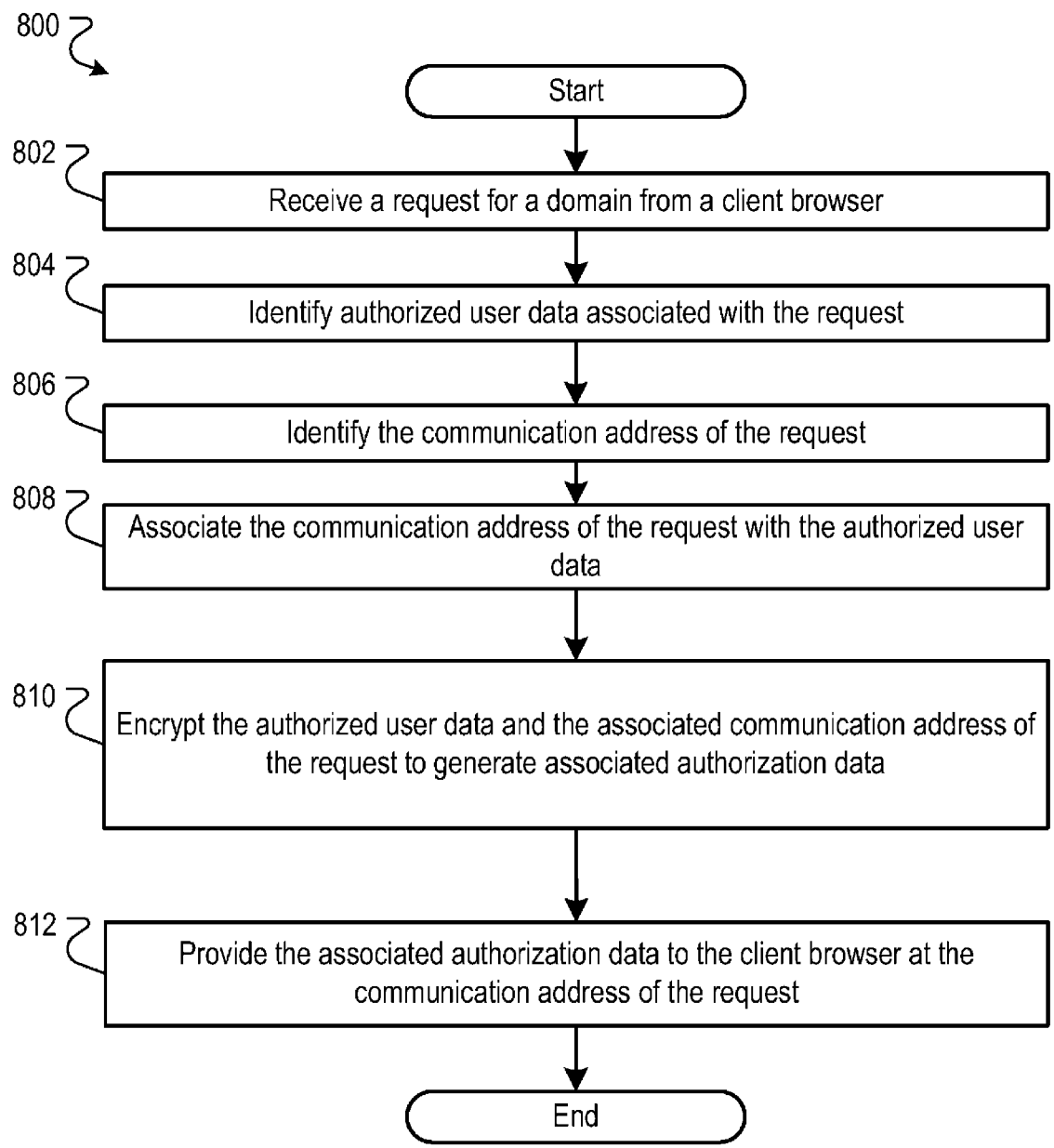
FIG. 8A is a flow diagram of an example process for preventing authorization data from being improperly obtained.

FIG. 8A is a flow diagram of an example process 800 for preventing authorization data from being improperly obtained. The process 800 can, for example, be implemented by the source processor 116c of FIG. 1, and as described in FIG. 7.

Stage 802 receives a request for a domain from a client browser. For example, the source processor 116c can receive a URL request from a client browser. The URL points to a domain. Thus, the source processor 116c can receive a request for a domain.

Stage 804 identifies authorized user data associated with the request. For example, the source processor 116c can identify any authorized user data transmitted with the request for the domain.

Stage 806 identifies the communication address of the request. For example, the source processor 116c can identify the port that the client browser 402 uses to communicated with the source processor 116c.

Stage 808 associates the communication address of the request with the authorized user data. For example, the source processor 116c associates the identified port with the authorization data transmitted in the request.

Stage 810 encrypts the authorized user data and the associated communication address of the request to generate associated authorization data. For example, the source processor 116c encrypts into the associate token the authorization data and the port associated with the authorization data.

Stage 810 provides the associated authorization data to the client browser at the communication address of the request. For example, the source processor 116c provides the associate token to the client browser 402 at the identified port.

Figure 8B:
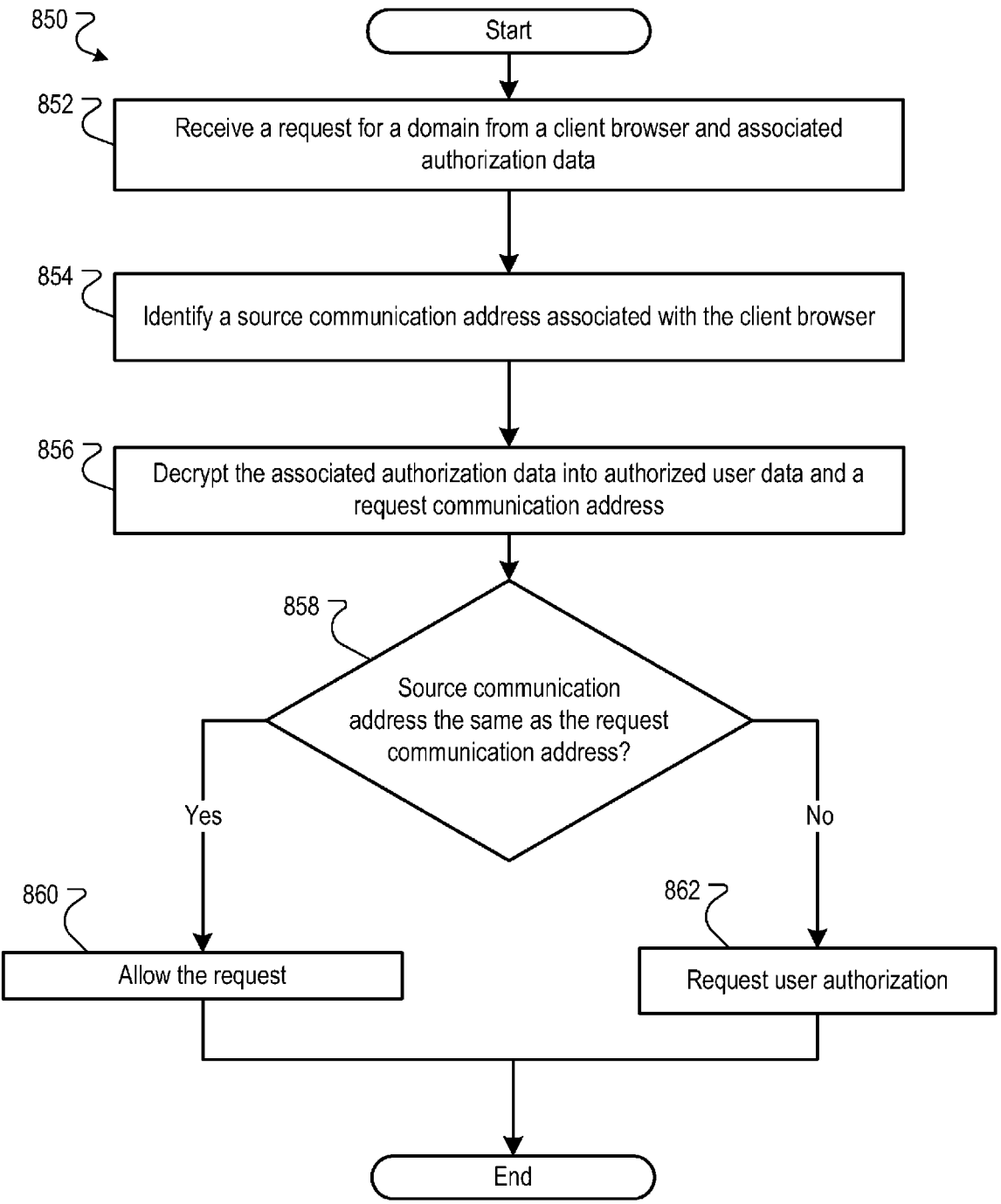
FIG. 8B is a flow diagram of an example process for handing authorization data that include source data.

FIG. 8B is a flow diagram of an example process 850 for preventing authorization data from being improperly obtained. The process 850 can, for example, be implemented by the source processor 116c of FIG. 1, and as described in FIG. 7.

Stage 852 receives a request for a domain from a client browser and associated authorization data. For example, the source processor 116c can receive a request for a URL request from a client browser. The URL points to a domain. Thus, the source processor 116c can receive a request for a domain. The source processor 116c can also receive with the request an associate token that is comprised of associated authorization data.

Stage 854 identifies a source communication address associated with the client browser. For example, the source processor 116c can identify the port that the client browser 402 uses to communicated with the source processor 116c.

Stage 856 decrypts the associated authorization data into authorized user data and a request communication address. For example, the source processor 116c can decrypt the associate token into authorized user data, e.g., authorization data, and a request communication address, e.g., a port associated with the authorization data.

Stage 858 determines whether the source communication address is the same as the request communication address. For example, the source processor 116c can compare the port identified by stage 854 with the port identified by stage 856.

If stage 858 determines that the source communication address is the same as the request communication address, stage 860 allows the request. For example, if the source processor 116c determines that the port identified by stage 854 is the same as the port identified by stage 856, then the request is allowed.

If stage 860 determines that the source communication address is not the same as the request communication address, stage 862 requests user authorization from the client browser at the request communication address. For example, if the source processor 116c determines that the port identified by stage 854 is not the same as the port identified by stage 856, then source processor 116c can request authorization from the client browser 402. In some implementations, the source processor 116c can trigger an external security service, e.g., the access agent 180 or the authority node 120, to obtain authorization from the client browser 402.

§7.0 Example Processes for Fraud Prevention

Figure 9:
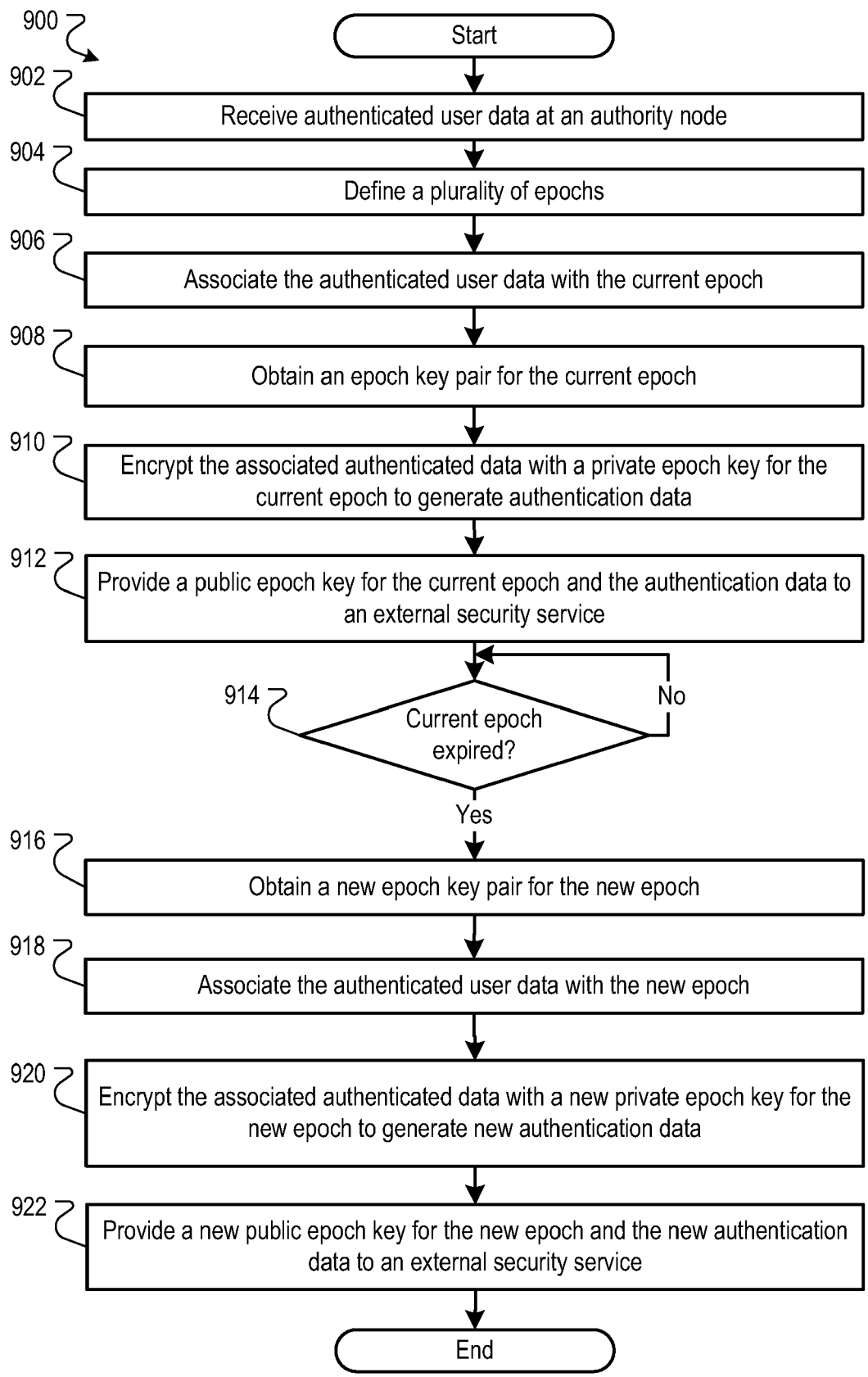
FIG. 9 is a flow diagram of an example process for generating authentication data associated with an epoch.

FIG. 9 is a flow diagram of an example process 900 for generating authentication data associated with an epoch. The process 900 can, for example, be implemented by the epoch manager 126 of FIG. 1, and as described in FIG. 7.

Stage 902 receives authenticated user data at an authority node. For example, the epoch manager 126 can receive authenticated user credentials at the authority node 120.

Stage 904 defines a plurality of epochs. For example, the epoch manager 126 can define that every fifteen minute interval is associated with an epoch. Each epoch can be identified by an identifier. Thus, the first fifteen minute interval is epoch 1, followed by epoch 2, etc.

Stage 906 associates the authenticated user data with the current epoch. For example, the epoch manager 126 can associate the user credentials with the current fifteen minute interval. If the current interval is the second fifteen minute interval, the epoch manager can accomplish this by associating the user credentials with epoch 2.

Stage 908 obtains an epoch key pair for the current epoch. For example, the epoch manager 126 can generate an epoch key pair for each epoch. The epoch manager 126 can obtain the epoch key pair for epoch 2.

Stage 910 encrypts the associated authenticated data with a private epoch key for the current epoch to generate authentication data. For example, the epoch manager 126 can use the private epoch key for epoch 2 to encrypt the association from stage 906. The encrypted association can become the authentication data associated with epoch 2.

Stage 912 provides a public epoch key for the current epoch and the authentication data to an external security service. For example, the epoch manager 126 can provide the public epoch key for epoch 2 to the processing node 110, which is a component of the external security service. The epoch manager 126 can provide the authentication data associated with epoch 2 to the access agent 180 or the processing node 110.

Stage 914 determines if the current epoch has expired. For example, the epoch manager 126 can determine that the second fifteen minute interval has expired, and that the third fifteen minute interval is the new current epoch, i.e., epoch 3.

If stage 914 determines that the current epoch has not expired, stage 914 continues to monitor the current epoch to determine when the epoch does expire. For example, the epoch manager 126 of FIG. 1 can continue to execute the stage 914 as defined above.

If stage 914 determines that the current epoch has expired, stage 912 obtains a new epoch key pair for the new epoch. For example, the epoch manager 126 can obtain a new epoch key pair for epoch 3.

Stage 918 associated the authenticated user data with the new epoch. For example, the epoch manager 126 can associate the user credentials with the third fifteen minute interval. The epoch manager can accomplish this by associating the user credentials with epoch 3.

Stage 920 then encrypts the associated authentication data with a new private epoch key for the new epoch to generate new authentication data. For example, the epoch manager 126 can use the private epoch key for epoch 3 to encrypt the association from stage 918. The encrypted association can become the authentication data associated with epoch 3.

Stage 922 then provides a new public epoch key for the new epoch and the new authentication data to an external security service. For example, the epoch manager 126 can provide the public epoch key for epoch 3 to the processing node 110, which is a component of the external security service. The epoch manager 126 can provide the authentication data associated with epoch 3 to the access agent 180 or the processing node 110.

Figure 10:
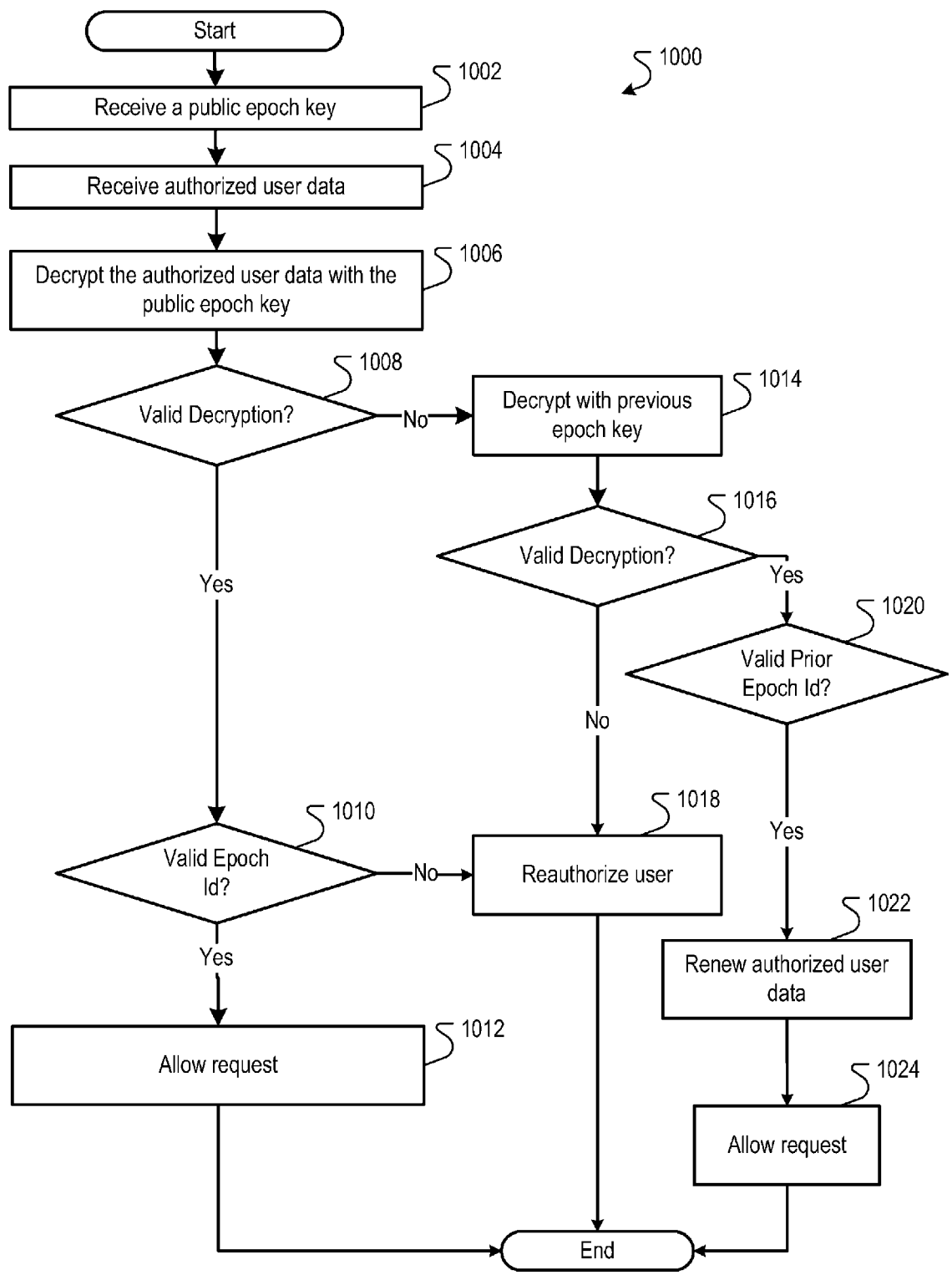
FIG. 10 is a flow diagram of an example process for handling authentication data associated with an epoch.

FIG. 10 is a flow diagram of an example process 1000 for handling authentication data associated with an epoch. The process 1000 can, for example, be implemented by the epoch processor 116b of FIG. 1, and as described in FIG. 7.

Stage 1002 receive a public epoch key. For example, the epoch processor 116b can receive a public epoch key for an epoch. The epoch processor 116b can also receive as an attribute of the public epoch key an epoch ID. The epoch ID can identify the epoch in which the public epoch key (and a corresponding private epoch key) was created.

Stage 1004 receives authorized user data. For example, the epoch processor 116b can receive authorized user data in the form of an authorization token.

Stage 1006 decrypts the authorized user data with the public epoch key. For example, the epoch processor 116b can use the public epoch key it received in stage 1002 to decrypt the authorized user data from the authorization token received in stage 1004.

Stage 1008 determines if the decryption of stage 1006 was valid. For example, if the epoch processor 116b can decrypt the authorized user data using the public epoch key of stage 1002, the decryption of stage 1006 was valid. If the epoch processor 116b is unable to decrypt the authorized user data using the public epoch key of stage 1002, the decryption of stage 1006 is not valid.

If stage 1008 determines that the decryption is valid, stage 1010 determines if the decrypted data contains a valid epoch ID. For example, if the decrypted value that resulted from the decryption of stage 1006 can be parsed to identify an epoch ID, e.g. a user epoch ID, the epoch processor 116b can determine whether the user epoch ID is the same as the epoch ID of the public key, e.g., the key epoch ID, that was used to decrypt the data. If the user epoch ID is the same and the key epoch ID, stage 1010 determines that the decrypted data contains a valid epoch ID. If the user epoch ID is not the same as the key epoch ID, stage 1010 determines that the decrypted data does not contain a valid epoch ID.

If stage 1010 determines that the decryption contains a valid epoch ID, stage 1012 allows the request. For example, where the user epoch ID is the same as the key epoch ID, the epoch processor 116b can determine that the authorized user data is not fraudulent and allow the request.

If stage 1008 determines that the decryption is not valid, stage 1014 attempts to decrypt the authorized user data with previous public epoch keys in the range of valid epochs. For example, the epoch processor 116b can use a previous public epoch key stored at the epoch processor 116b to decrypt the authorized user data from the authorization token received in stage 1004. A previous public epoch key can be used if the previous epoch key pair was generated within a range of valid epochs.

Stage 1016 then determines if the decryption of stage 1014 was valid. For example, if the epoch processor 116b can decrypt the authorized user data using a previous public epoch stored at the epoch processor 116b, the decryption of stage 1014 was valid. If the epoch processor 116b is unable to decrypt the authorized user data using a previous public epoch key stored at the epoch processor, the decryption of stage 1014 is not valid.

If stage 1016 determines that the decryption of stage 1014 was valid, stage 1020 determines if the decrypted data contains a valid epoch ID. For example, if the decrypted value that resulted from the decryption of stage 1014 can be parsed to identify an epoch ID, e.g. a user epoch ID, the epoch processor 116b can determine whether the user epoch ID is within an acceptable range of epochs as the epoch ID of the public epoch key, e.g., the key epoch ID, that was used to decrypt the data. If the user epoch ID is within an acceptable range of epochs as the key epoch ID, stage 1020 determines that the decrypted data contains a valid epoch ID. If the user epoch ID is not the within an acceptable range of epochs as the key epoch ID, stage 1020 determines that the decrypted data does not contain a valid epoch ID.

If stage 1020 determines that the decrypted data contains a valid epoch ID, stage 1022 renews the authorized user data. For example, if the epoch processor 116b can determine that the decrypted data contains a valid epoch ID using a previous public epoch key, the authorized user data is associated with a previous epoch ID that is still valid. The epoch processor 116b can request the access agent 180 or the authority node 120 to provide a current authorized user data associated with the current epoch. The epoch processor 116b substitute the authorized user data received at stage 1004 with the current authorized user associated with the current epoch.

Stage 1024 then allows the request. For example, the epoch processor 116b has determined that the authorized user data is not fraudulent, and can allow the request.

If stage 1010 determines that the decrypted data of stage 1006 does not contain a valid epoch ID, or if stage 1020 determines that the decrypted data of stage 1016 does not contain a valid ID, stage 1018 reauthorizes the user. For example, if the epoch processor 116b has determined that the decrypted data does not contain an valid ID, the epoch processor 116b can require reauthorization by the user.

§8.0 Example Processes for State Management

Figure 11:
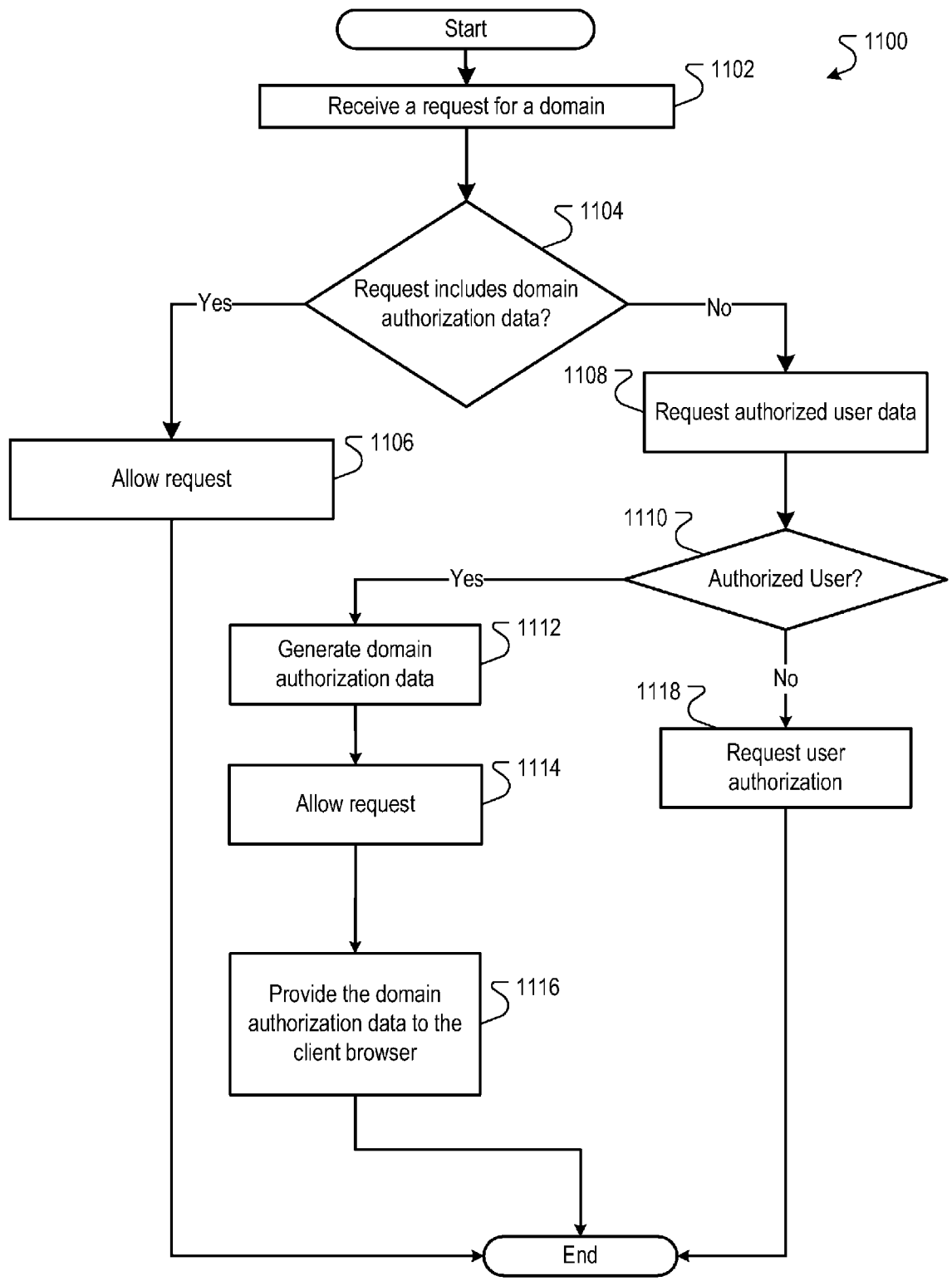
FIG. 11 is a flow diagram of an example process for handling authorized and unauthorized requests at a processing node.

FIG. 11 is a flow diagram of an example process for handling authorized and unauthorized requests at a processing node. The process 1100 can, for example, be implemented by the state manager 116a of FIG. 1, and as described in FIG. 4-6.

Stage 1102 receives a request for a domain. For example, the stage manager 116a can receive a request for a New Site 1 at Domain N.

Stage 1104 determines whether the request includes domain authorization data. For example, the state manager 116a can determine whether the request included domain authorization data for Domain N.

If stage 1104 determines that the request includes domain authorization data, stage 1106 allows the request. For example, if the state manager 116a determines that the request includes domain authorization data for Domain N, the state manager 116a can allow the request to Domain N for New Site 1.

If stage 1104 determines that the request does not include domain authorization data, stage 1108 requests authorized user data from the client browser 402. For example, if the state manager 116a determines that the request did not includes domain authorization data for Domain N, the state manager 116a can request authorized user data from the client browser 402.

Stage 1110 then determines whether the client browser 402 provided authorized user data. For example, the state manager 116a can determine if the client browser provided the authorized user data.

If stage 1110 determines that client browser 402 provided authorized user data, stage 1112 generates domain authorization data. For example, if the state manager 116a determines that the client browser provided user authorization data, the state manager 116a can generate domain authorization data for Domain N based on the authorized user data.

Stage 1114 allows the request. For example, the state manager 116a can allow the request to Domain N for New Site 1.

Stage 1116 then provides the domain authorization data to the client browser. For example, the state manager 116a can provide domain authorization data to the client browser 402 with the response from Domain N.

If stage 1110 determines that client browser 402 did not provide authorized user data, stage 1118 requests user authorization from the client browser. For example, if the state manager 116a determines that the client browser 402 did not provide authorized user data, the state manager 1116a can request authorization from the client browser 402. In some implementations, the state manager 116a can trigger an external security service, e.g., the access agent 180 or the authority node 120, to obtain authorization from the client browser 402.

§9.0 Transparent Traffic Redirection

The sections above describe various authentication and authorization techniques for use in a distributed security system 100. As described above, an access agent 180, located within an enterprise or, preferably, in an external node in the distributed security system 100 (e.g., an authority node 120), and/or the authority node 120, facilitates authentication and authorization techniques that are substantially transparent to an end user.

Another preferable transparency feature is transparent traffic redirection. To allow access to any Internet site from within an enterprise, the enterprise firewall allows requests from internal clients using certain protocols (such as HTTP and HTTPS) to be sent to Internet based servers, and the server's response is allowed to return to the requesting client. Network address translation (NAT) is a common mechanism used to ensure that only responses matching a client's requests are allowed into the network through the perimeter firewall. As content is to be inspected for policy enforcement, security, and/or compliance verification using the distributed security system 100, all traffic leaving the enterprise 200 must be transparently routed to the distributed security system 100 before it is sent to the target servers, such as the target site 404.

Figure 12:
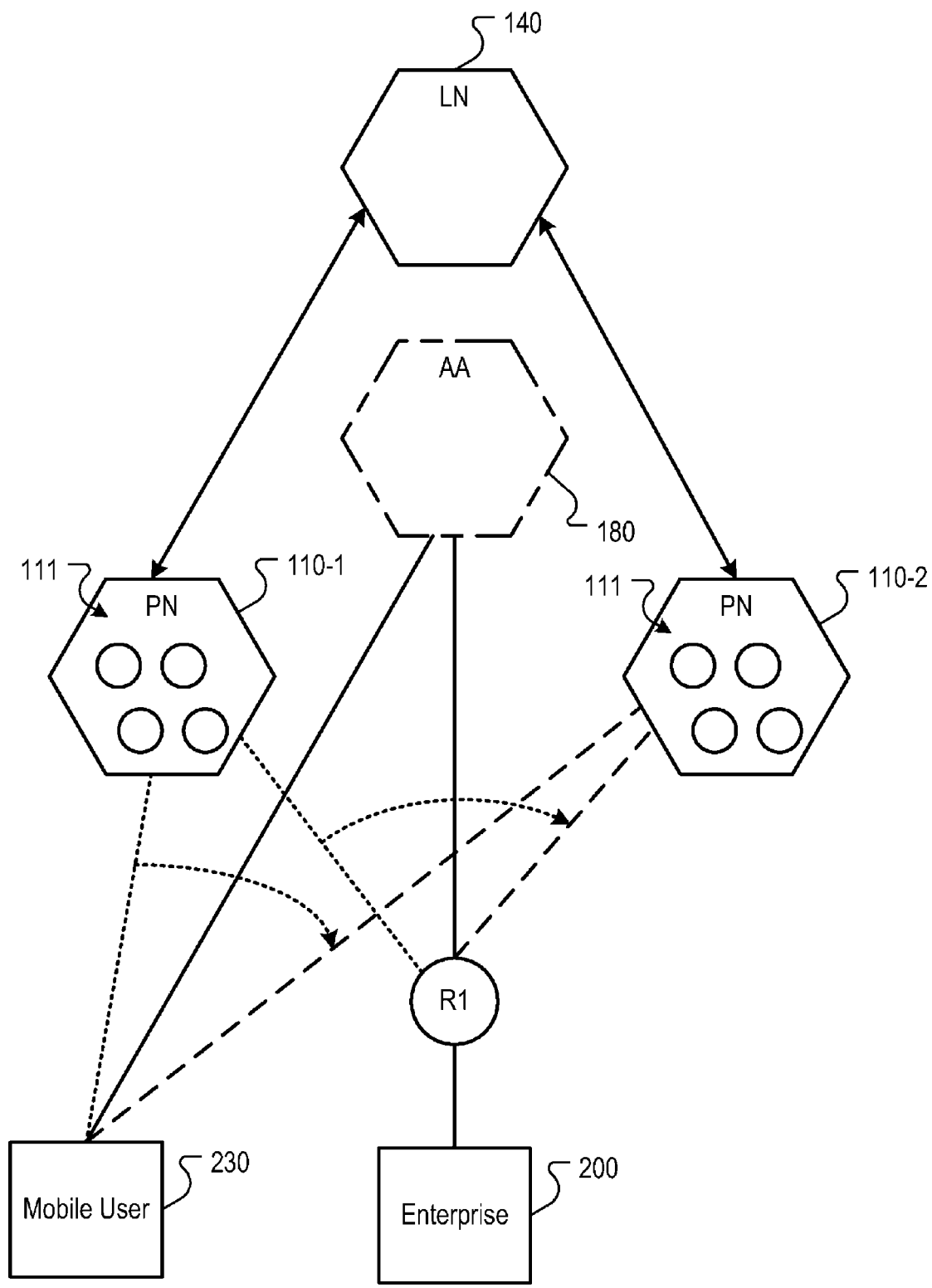
FIG. 12 is a block diagram of an example tunneling architecture in a distributed security system.

FIG. 12 is a block diagram of an example tunneling architecture 1200 in a distributed security system 100. An enterprise 200 uses a router R to establish a virtual gateway node 111 in a processing node 110-1. The virtual gateway node logically extends the enterprise security perimeter to the processing node 110-1 so that it appears to external networks that a gateway exists in the distributed security system 100 to create a private network between the distributed security system 100 and the enterprise 200 to carry the enterprise's web traffic. In some implementations, the processing node 110-1 is configured to host the IP address of the enterprise 200. Thus, each virtual gateway node 111 that is hosted by the processing node 110-1 corresponds to an enterprise and includes its corresponding enterprise 200 IP address.

As the IP address is owned by the enterprise 200, location based services interpret the traffic that is received from the distributed security system 100 as originating from the enterprise 200. In some implementations, the virtual gateway node 111 associated with the enterprise 200 is used to establish a tunnel between the enterprise 200 router R and the processing node 110-1. For example, if the router R has an IP address of H1, and the enterprise 200 IP address is V1, then the virtual gateway node 111 associated with the enterprise 200 can be used to establish a tunnel T1 from a source address H1 to the tunnel destination address V1:

$$T1=(H1, V1)$$

Thus, each processing node 110 hosts a plurality of virtual gateway nodes 111. Each virtual gateway node corresponds to an enterprise 200 and has an associated tunnel destination address Vx for a corresponding tunnel Tx. Each tunnel destination address Vx is an IP address of the corresponding enterprise 200.

In addition, certain deployments may offer transparency by hosting the security services on the ISP's POP (Point-of-Presence) in which case, the network addresses are assigned by the ISP.

In some implementations, each processing node 110 can use port mapping to communicate enterprise traffic to target sites. The port mapping technique makes a port number known to target sites that are in communication with the virtual gateway node 111 on the processing node 110. The forwarding a network port from the processing node to the target site allows the target site to reach the port on the processing node 110. For example, if an enterprise client at an IP address of "CLIENT_IP" sends a request to a target site having and IP address of "TARGET_IP", the following translations occur:

| [Addressing <Encapsulation>] | Description |
| --- | --- |
| [CLIENT_IP, TARGET_IP] | Addressing in client request |
| [GATEWAY_IP, VGN_IP, <CLIENT_IP, TARGET_IP>] | Addressing in tunnel from enterprise router to processing node |
| [VGN_IP, TARGET_IP, PORT] | Addressing in request forwarded from VGN to target |
| [TARGET_IP, VGN_IP, PORT] | Addressing in target site response |
| [VGN_IP, GATEWAY_IP, <TARGET_IP, CLIENT_IP>] | Addressing in tunnel from processing node to enterprise router |
| [TARGET_IP, CLIENT_IP] | Addressing in response to the client |

As described above, each processing node 110 stores security policy data defining security policies for each of the enterprises 200 and performs threat detection processes to classify content items according to a threat classification for a corresponding threat, and manage the classified content item in accordance with the security policy data. Accordingly, the security policies for the plurality of enterprises 200 in data communication with the processing nodes 110 over tunnels corresponding to the virtual gateway nodes 111 are implemented external to the network edges for each of the enterprises 200.

In some implementations, the content processed and inspected by the distributed security system 100 can be communicated over a data tunnel, and a separate authorization tunnel is established between the enterprise 100 and the access agent 180. For example, when the access agent 180 is hosted on an authority node 120, authentication requests from the users and resultant responses are communicated through the authorization tunnel. A user's first request to the distributed security system 100, which is not authenticated, causes the processing node 110 to send a redirect (HTTP redirect) response to the client device, which results in sending the original request through the authentication tunnel to the access agent 180. The access agent 180 then requests user credentials from the client and validates the credentials against those stored in the authority node 110. If the user credentials are successfully validated, the request is redirected to the processing node 110 so that it travels through the data tunnel. After authorization, a client browser inserts the authorization token along with the request, as described above. The resulting request is provided through the data tunnel an the processed at the processing node 110, which then cryptographically decodes the token to identify the user and fetches the user policy from AN.

For example, referring back to FIG. 4, if the timing diagram corresponds to system implementing the architecture of FIG. 12, then communications 406, 408, 410, 412, 422, 424, 426 and 432 are communicated through a data tunnel by use of a virtual gateway node 111, while the communications 414, 416, 418 and 420 are communicated through the authorization tunnel. Similarly, referring back to FIGS. 5 and 6, all communications are communicated through the data tunnel.

In some implementations, the encrypted authorization data transmitted through the data tunnels can store identity data so that originators of tunneled traffic can be identified. Example identity data includes an enterprise identifier, a tunnel identifier, and a user identifier. In some implementations, the IP address of a user's computing device and/or its MAC address can also be included. Such additional information may be used to verify the user's ownership of the token, as described above.

In some implementations, authentication tunnels are tunnels implemented without the VGNs. The purpose of the authentication tunnel is to provision authentication of user data, either in the distributed security services nodes, or in a node external to the distributed security service such as enterprise's own node. When the access agent is in the enterprise, the access agent communicates with an authority node 120 to obtain a user identity. The same user identity will be used by the processing nodes.

Thus, as the authorization tunnel typically will not communicate with external systems, i.e., systems that are outside of the distributed security system network, virtual gateway nodes need not be used to establish the authorization tunnel to the access agent 180. Instead, the authentication tunnel may address the distributed security system's 100 private network, i.e., the IP address of a node in the system 100 that hosts the agent 180. In other words, the IP address of the enterprise 200 need not be hosted by the node implementing the access agent 180.

In some implementations, the authentication tunnel endpoint is the IP address of the authority node 120 and is communicated to the enterprise. When nodes are able to setup tunnels using host names, it may do so without IP address binding, relying on the DNS resolution.

In some implementations, a single tunnel may carry both authentication and data traffic. In other implementations, authentication data may be processed using a different authentication tunnel, some times resident in the enterprise user's private network. For example, the data tunnel to the processing node 110 can also be used to process authorization traffic, and a separate tunnel to the access agent 180 is not used. For example, redirects to and data received from the access agent 180 is received and the processing node 110 and routed through the data tunnel T1. Such implementations may be useful when the access agent 180 and the processing node 110 are co-hosted.

In other implementations, the access agent 180 may run on an enterprise hosted proxy, in which case the authentication tunnel may be absent.

In some implementations, the health of the processing node 110 is monitored by one or more monitoring nodes. The monitoring functions can be distributed among the monitoring nodes depending on the data that is received and monitored by the monitoring nodes. In some implementations, the monitoring nodes can include the processing node 110 hosting the virtual gateway node, the logging node 140, and the authority node 120. In these implementations, the processing node 110 can monitor for the diction of path faults, e.g., failure to receive keepalive or hello packets over the tunnel. The logging node 140 can monitor for node failure of the processing node, and the authority node 120 also monitor for node failures in the processing node.

This partially redundant monitoring scheme can help ensure that failures related to the virtual gateway node 111 and/or the processing node 110 are detected by the distributed security system 100 before the failure is detected by the router or gateway on the edge of an enterprise 200. Such detection by the distributed security system 100 before the enterprise 200 router or gateway results in a migration failover, which is discussed in more detail below.

The health status of the processing node 110 can be used to identify a migration failover states for the tunnels. Example health status of the processing node 110 can include reception/acknowledgement of keepalive packets; exceeding a minimum data through-put and error status of data inspection engines 117 and the processing node manager 110; and the detection of path faults, path failures, and node failures.

In some implementations, a monitoring node, e.g., the logging node 140, can monitor and store tunnel state data for each tunnel. Example tunnel state data can include the number of packets transmitted and the number of bytes exchanged for each tunnel. The tunnel state data facilitates the migration of a virtual gateway node 111 and the corresponding tunnel to a new processing node 100 during a migration failover.

In some implementations, the monitoring node can detect path faults and path delay by measuring the time taken for the acknowledgement packets to be received by the monitoring node. Additionally, a monitoring node monitoring a separate processing node can also distinguish between node faults and path faults. A node fault occurs when multiple two or more monitoring nodes receive no responses from the processing node. A path fault, on the other hand, results in inconsistent responses. For example, monitor M1 receiving and acknowledge (ACK) from a first processing node, and monitor M2 not being able to receive an acknowledgement from the first processing node indicates a path fault.

To manage network traffic, the processing nodes 110 each propagate routing data related to the processing node 110 and the virtual gateway nodes 111 hosted by that processing node, and receives routing data propagated by other processing nodes 110 and the one or more monitoring nodes (e.g., logging node 140 or authority node 120) in data communication with the processing nodes 110. The routing data can be generated using existing routing techniques, such as LS routing algorithm, Dijkstra routing algorithm, etc. Example routing data can include a path list or a nearest neighbor list.

In some implementations, a virtual gateway node 111 migration failover can occur when a node failure of the processing node hosting the virtual gateway node is detected, or when a path fault from the processing node hosting the virtual gateway node 111 is detected. When a migration failover occurs, the address of the virtual gateway node 111 is relocated to another processing node 110 so that the virtual gateway node 111 is reachable and a new tunnel does not need to be established by the enterprise 200. When IP addresses are activated on a new processing node 110 in response to a migration failover (i.e., a new processing node 110 is selected to host the IP address of the enterprise 200), routing data, such as path list data or nearest neighbor data, are propagated by the processing nodes 110 as well as by the monitoring node 140 to other processing nodes 110. For example, as shown in FIG. 12, a failover has occurred in which the data tunnel for the enterprise 200 is moved from the processing node 110-1 to the processing node 110-2, as indicated by the dashed tunnel lines and the dashed arrows indicative the establishment of the tunnels on the processing node 110-2. The illustrations are representative of the updating of the hosting and routing tables in the processing nodes 110.

In some implementations, routing information for the migrated virtual gateway node 111 is also propagated to intervening routers. For example, let the VGN1 be a virtual gateway node hosted in processing node PN1, Rx be intervening routers, and let the enterprise endpoint be H1. An example routing path is:

[H1]----{R1,R2,R3}------[PN1].

When VGN1 is migrated to a second processing node PN1, the new path is:

[H1]-----{R1,R2,R4,R5}-----[PN2].

In this case, Router R2 must know that the next hop router for VGN1 is through R4. A monitoring node, in the event of failure, starts propagating route updates to the neighboring routers to facilitate the redirection.

The migration failover state results is a substantially transparent transition of a virtual gateway node 111 from a first processing node 110 to a second processing node 110, and is a failover state that is detected either by one or more monitoring nodes. In some implementations, the migration failover is accomplished by re-hosting the IP address of the enterprise on another processing node 110 and concurrently providing the tunnel status to the processing node 110. Thus, by receiving the tunnel status at the new processing node 110, the packets that are already in transit during the failover migrate can enter the migrated virtual gateway node 111. Additionally, as the tunnel status is available at the new processing node 110, the status of the tunnel and integrity of the encapsulated traffic (e.g., TCP/IP traffic) can be maintained.

In some implementations, the tunnel status is recorded as a part of the routine health monitoring and is available at the logging node 140. When a virtual gateway node 111 is migrated to a new processing node, the authority node 120 sends a migration message to both the old processing node currently hosting the virtual gateway node 111 that is being migrated, and to the new processing node that is to receive the virtual gate node 111. The migration message identifies the logging node 140 and the address at which the tunnel status data can be retrieved. The virtual gateway node 111 on the old processing node is marked as inactive, and the new processing node that receives and hosts the virtual gateway node 111 receives the tunnel status data and begins to accept packets destined to the virtual gateway node 111.

Figure 13:
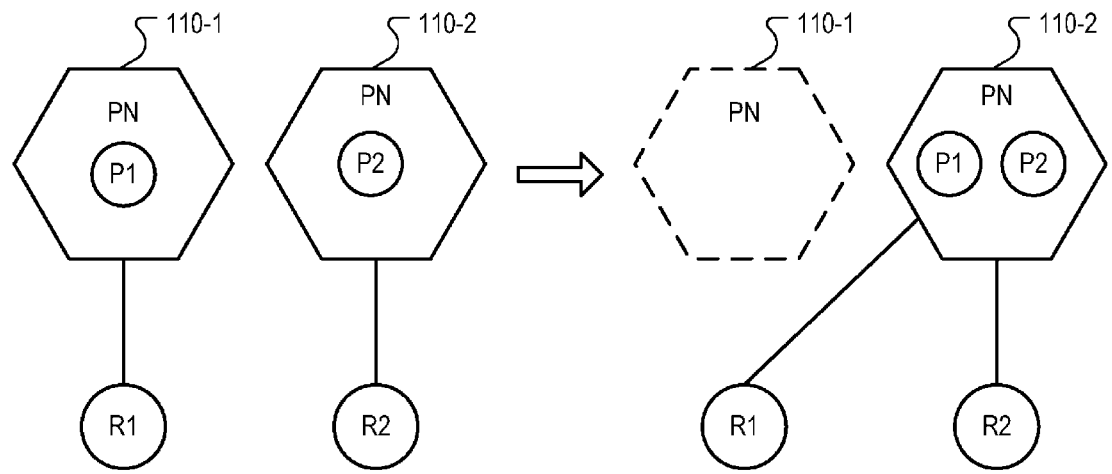
FIG. 13 is a block diagram illustrating a migration failover state resulting in a virtual gateway node migration.

FIG. 13 is a block diagram 1300 illustrating a migration failover state resulting in a virtual gateway node migration. As illustrated in FIG. 13, processing nodes 110-1 and 110-2 host virtual gateway nodes having IP endpoints IP1 and IP2, respectively. These IP endpoints are the IP addresses of the enterprises associated with the routers R1 and R2. As a result of a migration failover, mapping tables and routing data are updated to reflect that the processing node 110-2 hosts IP addresses IP1 and IP2, and thus the processing node 110-2 hosts the virtual gateway nodes having IP endpoints P1 and P2. The tunnel for the virtual gateway node having the IP address IP1 is thus substantially transparently relocated to the new processing node 110-2, and the corresponding data tunnel from router R1 does not need to be recreated. Thus packets that are already in transit enter the relocated virtual gateway node on the processing node 110-2.

In some implementations, the virtual gateway nodes 111 can have an associated home processing node 110. The association can, for example, be maintained in a table in either the logging node 140 or the authority node 120. The virtual gateway node 111 is hosted on the home processing node 110 when the home processing node 110 is in a healthy state, e.g., free of path errors and path faults, for example. When the virtual gateway node 110 is hosted on its home processing node 110, it is considered to be in an "owned" state.

When a virtual gateway node 111, however, is migrated to another processing node 110, is it considered to be in a "rented" state. The virtual gateway node 111 will be maintained in the rented state until the home processing node 110 recovers to a healthy state, at which time the virtual gateway node 111 will migrate back to its home processing node 110.

In the implementations in which partially redundant monitoring is implemented by the processing node 100, logging node 140, and authority node 120, the partially redundant can prevent or minimize excessive migration when a home processing node 110 is experiencing chronic failures. For example, failures in a processing node 110 can propagate failure signals (e.g., packet losses, excessive latency, etc.) through the distributed security system 100. Consolidating the monitoring in any one node can, in some situations, result in an inability to detect asymmetric failures in which the processing node 110 detects no failures when, in fact, failures are occurring. Thus, requiring two or more nodes with monitoring functions to classify a processing node 110 as healthy before the monitoring node 110 can receive a virtual gateway node 111 during a migration reduces the likelihood of migrating a virtual gateway node 110 to a processing node 110 that is, in fact, experiencing a failure.

In some implementations, the home processing node 110 of a virtual gateway node 111 can change due to load balancing or other optimization concerns. For example, if a new processing node 110 is brought on-line and is close in distance to an existing processing node 110, the one or more virtual gateway nodes 111 may associate the new processing node 110 as a home processing node 110 and migrate to the new processing node 110.

Figure 14:
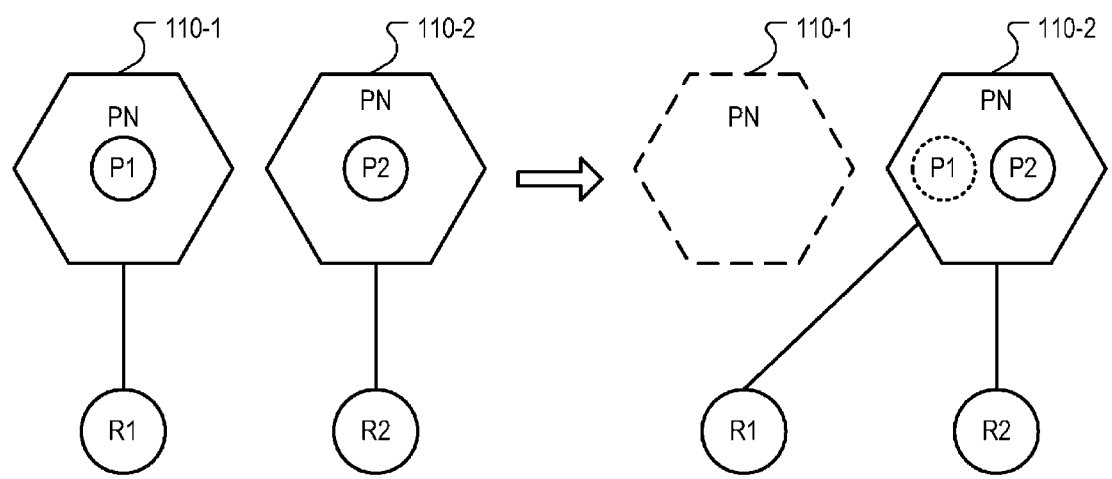
FIG. 14 is a block diagram illustrating a backup failover state resulting in the establishment of a backup virtual gateway node.

FIG. 14 is a block diagram 1400 illustrating a backup failover state resulting in the establishment of a backup virtual gateway node. A backup failover state occurs when the monitoring nodes cannot detect a failure before the enterprise 200 router R1 detects a tunneling failure, i.e., the processes in the processing node 110, the logging node 140 and the authority node 120 that are monitoring for failover states fail or, alternatively do not detect a failover state before an enterprise 200 router R1.

When this occurs, the router R1 tears down the existing tunnel to the processing node 110-1, which is hosting the virtual gateway node 111 for the enterprise 200, and establishes a new tunnel on the processing node 110-2. However, the new processing node 110-2 does not initially host the IP address of the enterprise 200, and thus a virtual gateway node 111 for the enterprise 200 is not established. By subsequently updating the routing and host data for the processing nodes 110, however, the virtual gateway node 111 for the enterprise 200 can be established on the processing node 110-2.

The establishment of a backup virtual gateway node 111 and data tunnel, however, is not substantially transparent to the enterprise 200, and may result in an increase in traffic latency and loss of user sessions.

Figure 15:
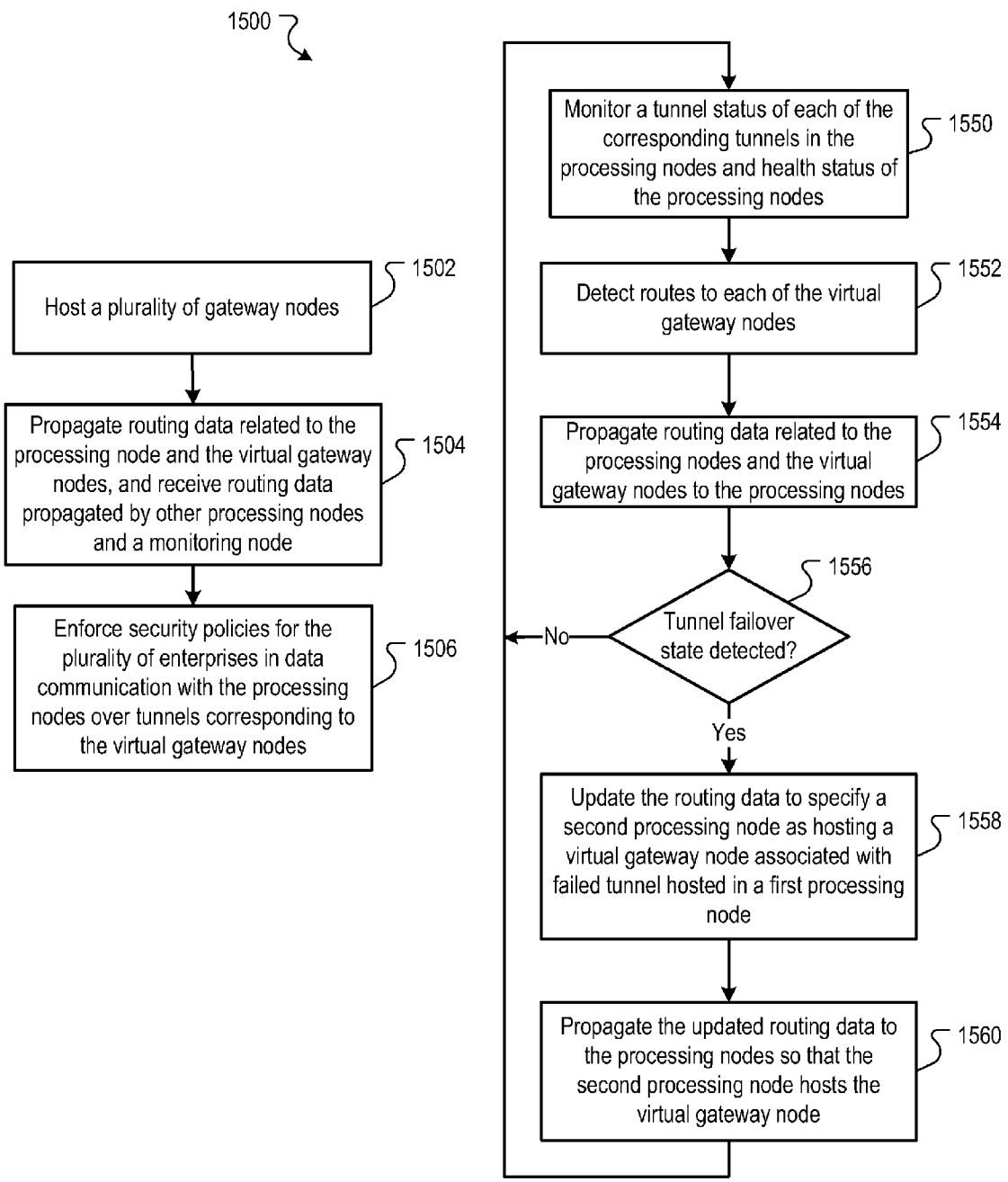
FIG. 15 is a flow diagram of an example process for providing security services to enterprises over processing nodes by use of tunneling.

FIG. 15 is a flow diagram of an example process for providing security services to enterprises over processing nodes by use of tunneling. The steps of the process 1500 can be distributed over several different types of nodes in the distributed security system 100, or, alternatively, can be implemented in the processing nodes 110.

Each processing node hosts a plurality of virtual gateway nodes (1502). Each virtual gateway node corresponds to an enterprise 200 and has an associated tunnel destination address for a corresponding tunnel. In some implementations, each tunnel destination address is the IP address of the corresponding enterprise 200.

Each processing node propagates routing data related to the processing node and the virtual gateway nodes, and receives routing data propagated by other processing nodes and a monitoring node in data communication with the processing nodes (1504). In some implementations, more than one monitoring node is used, e.g., the partially redundant monitoring scheme in which each processing node 110 monitors for local failures and faults, and in which the logging node 140 and the authority node 120 also monitor for node failures.

Each processing node enforces security policies for a plurality of enterprises in data communication with the processing node over tunnels corresponding to the virtual gateway nodes hosted by the processing node (1506).

A monitoring node monitors a tunnel status of each of the corresponding tunnels in the processing nodes and health status of the processing nodes (1550). For example, the authority node 120 and/or the logging node 140 can monitor for node failures in the processing node 110. In some implementations, each processing node can monitor for path faults and failures, and can monitor the tunnel health and status. The health and status of the processing node and the tunnels can be communicated to the logging node 140 and the authority node 120.

A monitoring node can detect routes to each of the virtual gateway nodes and propagate routing data related to the processing nodes and the virtual gateway nodes to other processing nodes (1552) and propagate the routing data to the processing nodes (1554). For example, the logging node 140 can detect IP routing paths in the distributed security system 100 and propagate the routing data to the processing nodes 110.

A monitoring node can determine if any failover states for the tunnels are identified (1556). For example, a logging node can identify a failure in a processing node 110. If no failover states are detected, monitoring continues (1502).

If a failover state for a first processing node hosting a first tunnel is detected, then the routing data is updated by the monitoring node to specify a second processing node as hosting a virtual gateway node associated with the first tunnel and hosted in the first processing node (1558). For example, a virtual gateway node hosted at the failing processing node can be re-hosted by updating routing data to specify a second processing node as hosting the virtual gateway node, i.e., hosting the IP address of the enterprise 200.

The monitoring node propagates the updated routing data to the processing nodes so that the second processing node hosts the virtual gateway node (1560). Accordingly, the virtual gateway node is hosted in the second processing node. In some implementations, tunnel state data is provided to the second processing node to facilitate a substantially transparent migration of the virtual gateway node from the first processing node to the second processing node.

While the above transparent redirection of traffic has been described with respect to enterprises 200, the same techniques can apply to client devices communicating thorough a router, or to mobile devices 230 communicating directly to the processing nodes.

Embodiments of the subject matter and the functional operations described in this specification can be implemented in digital electronic circuitry, or in computer software, firmware, or hardware, including the structures disclosed in this specification and their structural equivalents, or in combinations of one or more of them. The computer readable medium can be a machine readable storage device, a machine readable storage substrate, a memory device, a composition of matter effecting a machine readable propagated signal, or a combination of one or more of them.

A computer program (also known as a program, software, software application, script, manager, processor, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Additionally, the logic flows and structure block diagrams described in this patent document, which describe particular methods and/or corresponding acts in support of steps and corresponding functions in support of disclosed structural means, may also be utilized to implement corresponding software structures and algorithms, and equivalents thereof. The processes and logic flows described in this specification can be performed by one or more programmable processors executing one or more computer programs to perform functions by operating on input data and generating output.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A network security system, comprising: a plurality of processing nodes external to network edges of a plurality of enterprises, each processing node performing operations comprising: hosting a plurality of tunnel endpoints, each tunnel endpoint being associated with a corresponding enterprise and being a tunnel endpoint for a tunnel between the enterprise and the processing node; and storing security policy data defining security policies for each of the enterprises, performing threat detection processes to classify content items communicated over the tunnel between the enterprises and the processing node and managing the classified content items in accordance with the security policy data so that security policies for the enterprises in communication with the processing node over tunnels are implemented external to the network edges for each of the enterprises, wherein hosting the plurality of tunnel end points, each tunnel endpoint being associated with a corresponding enterprise and being a tunnel endpoint for a communication tunnel between the enterprise and the processing node comprises the operations of: hosting a plurality of virtual gateway nodes, each virtual gateway node corresponding to an enterprise and having an associated tunnel destination address for a corresponding tunnel, each tunnel destination address being one of the tunnel endpoints; wherein each processing node performs the further operation of propagating routing data related to the processing node and the virtual gateway nodes, and receiving routing data propagated by processing nodes and a monitoring node in data communication with the processing nodes; and wherein the monitoring node is configured to perform operations comprising: monitoring a tunnel status of each of the corresponding tunnels in the processing nodes; detecting routes to each of the virtual gateway nodes and propagating routing data related to the processing nodes and the virtual gateway nodes to the processing nodes; and identifying failover states for the tunnels, and in response to identifying a failover state for a first tunnel in a first processing node:

updating the routing data to specify a second processing node as hosting a virtual gateway node associated with the first tunnel and hosted in the first processing node; and propagating the updated routing data to the processing nodes so that the second processing node hosts the virtual gateway node.

2. The system of claim 1, wherein the operation of identifying failover states for the tunnels comprises identifying migration failover states; and in response to identifying a migration failover state for the first tunnel in the first processing node, providing tunnel state data for the first tunnel corresponding to the virtual gateway node hosted in the first processing node to the second processing node; wherein the updated routing data specifies the same tunnel destination address for the virtual gateway node for the first tunnel identified in the migration failover state.

3. The system of claim 2, wherein the tunnel state data includes a number of packets transmitted and a number of bytes exchanged in the tunnel.

4. The system of claim 1, wherein the monitoring node is an authority node.

5. The system of claim 1, wherein the monitoring node is a logging node.

6. The system of claim 1, further comprising an access agent configured to perform operations comprising:

for each corresponding enterprise, processing authorization and authentication requests over an authorization tunnel corresponding to the enterprise, the authorization tunnel being a tunnel that is separate from the tunnel corresponding to the enterprise.

7. The system of claim 6, wherein the authorization tunnel is defined by an authorization tunnel destination address that is hosted on an authority node.

8. The system of claim 1, wherein the processing node is further configured to perform the operations of port mapping traffic exchanged between a virtual gateway node and a target site.

9. A network security system, comprising:

a plurality of processing nodes external to network edges of a plurality of enterprises, each processing node performing operations comprising:

hosting a plurality of internet protocol addresses, each internet protocol address corresponding to an enterprise and being a tunnel destination address for a corresponding tunnel established between the enterprise and the processing node;

propagating routing data related to the processing node and the internet protocol addresses, and receiving routing data propagated by other processing nodes and a monitoring node in data communication with the processing node, the routing data defining routing for the internet protocol addresses hosted by the processing nodes; and storing security policy data defining security policies for each of the enterprises, performing a threat detection process to classify content items according to a threat classification for a corresponding threat, and managing the classified content item in accordance with the security policy data so that security policies for the plurality of enterprises in data communication with the processing nodes over the corresponding tunnels established between the enterprise and the processing node are implemented external to the network edges for each of the enterprises;

wherein the monitoring node is configured to perform operations comprising:

monitoring a tunnel status of each of the corresponding tunnels in the processing nodes;

detecting routes to each of the internet protocol addresses and propagating corresponding routing data related to the processing nodes and the internet protocol addresses hosted by the processing nodes to the processing nodes; and identifying failover states for the tunnels, and in response to identifying a failover state for a first tunnel in a first processing node:

updating the routing data to specify a second processing node as hosting an internet protocol address that is the tunnel destination address of the first tunnel and hosted in the first processing node; and propagating the updated routing data to the processing nodes so that the second processing node hosts the internet protocol address.

10. The system of claim 9, wherein the operation of identifying failover states for the tunnels comprises identifying migration failover states; and in response to identifying a migration failover state for the first tunnel in the first processing node, providing tunnel state data for the first tunnel to the second processing node;

wherein the updated routing data specifies the same tunnel destination address for the first tunnel identified in the migration failover state.

11. The system of claim 10, wherein the tunnel state data includes a number of packets transmitted and a number of bytes exchanged in the tunnel.

12. The system of claim 9, wherein the operation of identifying failover states for the tunnels comprises identifying backup failover states; and in response to identifying a backup failover state for the first tunnel in the first processing node, updating the routing data to specify a different tunnel destination address for the first tunnel identified in the migration failover state.

13. The system of claim 9, wherein the monitoring node is a logging node.

14. The system of claim 9, further comprising an access agent configured to perform operations comprising:

for each corresponding enterprise, processing authorization and authentication requests over an authorization tunnel corresponding to the enterprise, the authorization tunnel being a tunnel that is separate from the tunnel established between the enterprise and the processing node.

15. The system of claim 14, wherein the authorization tunnel is defined by an authorization tunnel destination address that is hosted on an authority node.

16. A computer-implemented method for providing security services to a plurality of enterprises over a plurality of processing nodes external to the network edges of the enterprises, the method comprising:

in each processing node:

hosting a plurality of virtual gateway nodes, each virtual gateway node corresponding to an enterprise and having an associated tunnel destination address for a corresponding tunnel, each tunnel destination address being an internet protocol address of the corresponding enterprise;

propagating routing data related to the processing node and the virtual gateway nodes, and receiving routing data propagated by other processing nodes and a monitoring node in data communication with the processing nodes, wherein the plurality of processing nodes and the monitoring node each comprise a server;

managing classified content items in accordance with security policy data so that security policies for the plurality of enterprises in data communication with the processing nodes over tunnels corresponding to the virtual gateway nodes are implemented external to the network edges for each of the enterprises;

in the monitoring node:

monitoring a tunnel status of each of the corresponding tunnels in the processing nodes;

detecting routes to each of the virtual gateway nodes and propagating routing data related to the processing nodes and the virtual gateway nodes to the processing nodes; and identifying failover states for the tunnels, and in response to identifying a failover state for a first tunnel in a first processing node:

updating the routing data to specify a second processing node as hosting a virtual gateway node associated with the first tunnel and hosted in the first processing node; and propagating the updated routing data to the processing nodes so that the second processing node hosts the virtual gateway node.

17. The method of claim 16, wherein identifying failover states for the tunnels comprises identifying migration failover states; and in response to identifying a migration failover state for the first tunnel in the first processing node, providing tunnel state data for the first tunnel corresponding to the virtual gateway node hosted in the first processing node to the second processing node;

wherein the updated routing data specifies the same tunnel destination address for the virtual gateway node for the first tunnel identified in the migration failover state.

18. The method of claim 16, wherein identifying failover states for the tunnels comprises identifying backup failover states; and in response to identifying a backup failover state for the first in the first processing node, updating the routing data to specify a different tunnel destination address for the virtual gateway node for the tunnel identified in the migration failover state.

19. The method of claim 16, further comprising for each corresponding enterprise, processing authorization and authentication requests over an authorization tunnel corresponding to the enterprise, the authorization tunnel being a tunnel that is separate from the tunnel corresponding to the virtual gateway node of the corresponding enterprise.

* * * * *